(12) United States Patent  
Ishimoto

(10) Patent No.: US 9,081,126 B2  
(45) Date of Patent: Jul. 14, 2015

(54) ILLUMINATION DEVICE, DISPLAY DEVICE, AND TELEVISION RECEPTION DEVICE

(75) Inventor: Yoshitake Ishimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 185 days.

(21) Appl. No.: 13/990,023

(22) PCT Filed: Nov. 22, 2011

(86) PCT No.: PCT/JP2011/076855  
§ 371 (c)(1),  
(2), (4) Date: May 28, 2013

(87) PCT Pub. No.: WO2012/073750  
PCT Pub. Date: Jun. 7, 2012

(65) Prior Publication Data  
US 2013/0250183 A1   Sep. 26, 2013

(30) Foreign Application Priority Data  
Nov. 29, 2010   (JP) .................... 2010-265113

(51) Int. Cl.  
*F21V 8/00*   (2006.01)  
*G02F 1/1335*   (2006.01)  
*H04N 5/64*   (2006.01)  
*H04N 5/66*   (2006.01)  
*G02F 1/1333*   (2006.01)

(52) U.S. Cl.  
CPC ........ *G02B 6/0085* (2013.01); *G02F 1/133385* (2013.01); *G02F 1/133608* (2013.01); *G02F 1/133615* (2013.01); *H04N 5/64* (2013.01); *H04N 5/66* (2013.01); *G02B 6/009* (2013.01); *G02F 2203/60* (2013.01)

(58) Field of Classification Search  
USPC ............... 362/247, 218, 294, 373, 249.02, 362/311.02, 545, 800, 612, 97.3, 613, 611  
See application file for complete search history.

(56) References Cited

U.S. PATENT DOCUMENTS

| | | | |
|---|---|---|---|
| 2007/0170452 A1 | 7/2007 | Kurokawa et al. | |
| 2009/0097277 A1* | 4/2009 | Iwasaki | 362/628 |
| 2010/0277664 A1 | 11/2010 | Kim et al. | |
| 2012/0249923 A1* | 10/2012 | Kono | 349/62 |

(Continued)

FOREIGN PATENT DOCUMENTS

| | | |
|---|---|---|
| JP | 2001-160312 A | 6/2001 |
| JP | 2007-305435 A | 11/2007 |

(Continued)

*Primary Examiner* — Laura Tso  
(74) *Attorney, Agent, or Firm* — Chen Yoshimura LLP

(57) ABSTRACT

Disclosed is an edge-light type illumination device that saves space while increasing the heat dissipation efficiency of heat emitted from a light source. The disclosed illumination device is provided with: a light source (17); a light guide plate (18) having a light-receiving surface (18*a*) disposed facing the light source (17) and receiving light from the light source (17), and a light-emitting surface (18*b*) from which the light is emitted; a chassis (14) having a bottom plate (14*a*) arranged in parallel with the light emitting surface (18*b*), with the light source (17) arranged on an edge of the bottom plate (14*a*); and a heat dissipating member (30) having a mounting section (31) that faces the light-receiving surface (18*a*) and that has the light source (17) mounted thereon, and a heat-dissipating section (32) connected with the mounting section (31) so as to transfer heat and being in contact with the bottom plate (14*a*) of the chassis (14).

13 Claims, 13 Drawing Sheets

(56) References Cited

U.S. PATENT DOCUMENTS

2012/0281155 A1* 11/2012 Takano .................. 348/790
2012/0287355 A1* 11/2012 Oya ...................... 348/790
2012/0294041 A1* 11/2012 Huang ................... 362/612

FOREIGN PATENT DOCUMENTS

| | | |
|---|---|---|
| JP | 2010-135126 A | 6/2010 |
| JP | 2010-177076 A | 8/2010 |
| JP | 2010-262292 A | 11/2010 |

* cited by examiner

ILLUMINATION DEVICE, DISPLAY DEVICE, AND TELEVISION RECEPTION DEVICE

TECHNICAL FIELD

The present invention relates to an illumination device, a display device, and a television receiver.

BACKGROUND ART

In recent years, flat display panels such as liquid crystal panels and plasma display panels are increasingly used as display elements for image display devices such as television receivers instead of conventional cathode-ray tube displays, allowing image display devices to be made thinner. Liquid crystal panels used in liquid crystal display devices do not emit light on their own, and therefore, it is necessary to provide a separate backlight device as an illumination device. The backlight device is disposed on a rear surface of a display panel opposite to the display surface, and includes a light source, a light guide plate that converts light from the light source to light to illuminate the screen, and a metal chassis that stores these components therein, for example. The backlight devices are generally categorized into a direct-light type and an edge-light type, and between the two, the edge-light type has a greater advantage than the direct-light type in terms of making the device thinner.

In the edge-light type backlight device, the light guide plate has a light-emitting surface facing the display panel, and a light-receiving surface on a side face thereof, and the light source is disposed facing the light-receiving surface. An LED is suitably used as the light source, but in order to use LEDs for the edge-light type, it is necessary to arrange LEDs at a high density so as to obtain a required light amount. This causes an increase in temperature around the LEDs, resulting in problems such as a reduction in light-emitting efficiency of LEDs and a heat deterioration of LEDs. As a technique to solve the above-mentioned problems, the configuration disclosed in Patent Document 1 is known.

The backlight device described in Patent Document 1 includes: a plurality of light guide plates arranged in a tandem manner; LED substrates having an L-shaped cross section and having LEDs mounted thereon so as to correspond to the respective light guide plates; heat-dissipating plates having an L-shaped cross section and bonded to opposite surfaces of the respective LED substrates to the LED mounting surfaces; a sub-chassis that defines the positions of the LED substrates and the light guide plates to each other; and a rear frame to which these components are attached. With this configuration, each contact area between the LED substrate and the heat-dissipating plate, and between the LED substrate and the sub-chassis can be made larger, and a heat-transfer resistance between the respective members can be made smaller. As a result, it is possible to improve the heat-dissipating efficiency in dissipating heat from the LEDs to the outside through the rear frame.

RELATED ART DOCUMENT

Patent Document

Patent Document 1 Japanese Patent Application Laid-Open Publication No. 2010-177076

Problems to be Solved by the Invention

However, in the configuration in which heat from the LEDs is dissipated to the outside through a plurality of members, the more members the heat needs to be transferred through, the more the heat-dissipating efficiency is reduced. Some of the edge-light type backlight devices have a configuration in which light sources are disposed at outer edges of a single light guide plate, and in such a configuration, because space between the light sources is smaller, the amount of heat generated per unit area is increased as compared with the tandem arrangement. In addition, because the size of the light sources and the size of the heat-dissipating structure directly affect the outer dimension of the backlight device, and the frame size around the light guide plate, in particular. Therefore, further improvement in heat-dissipating efficiency with a limited space is sought after.

SUMMARY OF THE INVENTION

The present invention was made in view of the above-mentioned situation, and an object thereof is to improve a heat-dissipating efficiency of heat generated by light sources while saving space in an edge-light type illumination device.

Means for Solving the Problems

The present invention includes: a light source; a light guide plate that has a light-receiving surface and a light-emitting surface, the light-receiving surface facing the light source and receiving light from the light source, the light-emitting surface emitting the light; a chassis that has a bottom plate disposed in parallel with the light-emitting surface, the chassis having the light source disposed in an edge portion of the bottom plate; and a heat-dissipating member that has a mounting section and a heat-dissipating section, the mounting section facing the light-receiving surface and having the light source mounted thereon, the heat-dissipating section being connected to the mounting section to allow heat transfer and being in contact with the bottom plate of the chassis.

With this configuration, it is not necessary to use the light source substrate, unlike the conventional configuration in which a light source is mounted on the light source substrate that is provided separately from a heat-dissipating member, and the light source substrate is attached to the heat-dissipating member, for example. Therefore, it is possible to improve the heat-dissipating efficiency of heat generated by the light source while saving space. That is, in the heat transfer path between the light source and the chassis through which heat from the light source is dissipated to the outside, the number of boundary faces can be reduced as a result of omitting the light source substrate. This makes it possible to reduce the heat transfer resistance, thereby improving the heat-dissipating efficiency. Also, the space can be saved by the eliminated light source substrate, achieving a reduction in the outer dimension of the illumination device, which is the frame area around the light guide plate, in particular.

Among the constituting members of the illumination device, the light source substrate itself and fixing parts therefor such as screws can be eliminated, thereby contributing to a reduction in manufacturing cost. Also, because a step of attaching the light source substrate to the heat-dissipating member can be eliminated, a reduction in manufacturing cost due to a reduction in man-hour can be expected.

In the configuration of the heat-dissipating member, the heat-dissipating section that is in contact with the bottom plate of the chassis is provided in addition to the mounting section where the light source is mounted. With this configuration, heat from the light source transferred to the mounting section is transferred to the chassis through the heat-dissipating section, and is dissipated to the outside through the chassis. By providing the heat-dissipating section, it is possible to increase the contact area between the heat-dissipating member and the chassis as compared to the configuration in which heat is directly transferred to the chassis from the mounting section, and as a result, the heat-dissipating efficiency of the heat-dissipating member can be improved.

The following configurations can be suitably employed as embodiments of the present invention.

(1) The heat-dissipating section is provided on a side of the mounting section opposite to the light guide plate. With this configuration, the heat-dissipating section is provided closer to the outer edge of the chassis, which is on the side of the mounting section opposite to the light guide plate, and therefore, it is possible to improve the heat-dissipating efficiency. That is, if the heat-dissipating section is disposed closer to the light guide plate than the mounting section, and overlaps a region between the light source and the light-receiving surface of the light guide plate where light from the light source is mixed, the heat-dissipating section would absorb heat from the area having a higher temperature than other areas due to light from the light source, in addition to the heat transferred to the mounting section. As a result, the heat-dissipating efficiency by the heat-dissipating section would be reduced. On the other hand, when the heat-dissipating section is provided closer than the mounting section to the outer edge of the chassis, which has a lower temperature than the area closer to the light guide plate, the heat-dissipating efficiency can be improved.

In a manner similar to above, if the heat-dissipating section is disposed closer to the light guide plate than the mounting section, a portion of the light guide plate and a portion of the heat-dissipating section overlap each other, causing the thickness of the illumination device to be increased. That is, in the configuration in which the heat-dissipating section is disposed closer to the light guide plate than the mounting section, if the heat-dissipating plate is enlarged so as to improve the heat-dissipating performance, the heat-dissipating section becomes larger than the light-receiving surface of the light guide plate, thereby overlapping the light guide plate. As a result, the thickness of the illumination device is increased. In other words, with the configuration in which the heat-dissipating section is disposed closer to the light guide plate than the mounting section, it was difficult to achieve both of an improvement in heat-dissipating performance and a reduction in thickness of the illumination device. On the other hand, in the present invention, the heat-dissipating section is disposed on a side of the mounting section opposite to the light guide plate. This makes it possible to ensure a sufficient contact area between the heat-dissipating section and the chassis, for example, regardless of the distance between the light source to the light-receiving surface of the light guide plate, and therefore, it is possible to further improve the heat-dissipating efficiency while achieving a reduction in thickness of the illumination device.

(2) The mounting section has a mounting surface where the light source is mounted, and the heat-dissipating section has a heat-dissipating surface in contact with the chassis. The heat-dissipating surface is extended in a direction perpendicular to the mounting surface, and the surface area of the heat-dissipating surface is larger than the surface area of the mounting surface. With this configuration, it is possible to improve the heat transfer efficiency to the chassis, thereby improving the heat-dissipating efficiency.

(3) The light source is made of an LED. By applying the present invention to a device that uses LEDs as the light source, it is possible to increase a life of the light source and to reduce power consumption.

When LEDs are used as the light source, an illumination area of the emitted light is limited as compared with a linear light source, and therefore, some devices employ a configuration in which a plurality of LEDs are arranged in a row along the light-receiving surface of the light guide plate. In terms of the positional relation between the respective LEDs and the light-receiving surface in this case, it is preferable to provide at least certain spacing therebetween because if the LEDs and the light-receiving surface are too close to each other, some areas in the light guide plate become outside of the illumination areas of the respective LEDs, and such areas are possibly recognized as dark areas. On the other hand, in order to reduce the frame area, it is preferable to minimize the spacing between the respective LEDs and the light-receiving surface. In the present invention, the light source substrate is not provided, unlike the conventional configuration, and therefore, it is possible to reduce the frame area by the thickness of the light source substrate while preventing an occurrence of the uneven brightness.

(4) The heat-dissipating member includes a fin that protrudes from the mounting section or from the heat-dissipating section. By providing the fin, the surface area of the heat-dissipating member can be further increased, and therefore, it is possible to dissipate heat transferred to the heat-dissipating member more efficiently.

(5) The mounting section is formed in a flat plate shape, and one surface thereof is a mounting surface where the light source is mounted. The heat-dissipating section is formed in a flat plate shape, and one surface thereof is a heat-dissipating surface in contact with the chassis. The heat-dissipating section is perpendicular to the mounting section, and the fin is provided so as to protrude in a direction perpendicular to the mounting surface or the heat-dissipating surface. With this configuration, the fin can be formed by a protrusion forming or the like, and an excellent formability can be achieved. By providing the fin so as to protrude in a direction perpendicular to the mounting surface or the heat-dissipating surface, an excellent heat-dissipating efficiency can be achieved while reducing the size of the heat-dissipating member.

(6) The heat-dissipating member includes a plurality of fins, and each fin protrudes toward the chassis. The chassis has an engaging section having recesses and protrusions that engage the plurality of fins, thereby fixing the heat-dissipating member to the chassis. With this configuration, the heat-dissipating member can be fixed to the chassis without using screws or the like, and as a result, a cost reduction by further reducing the number of components can be expected. Also, because the fins and the engaging portion with recesses and protrusions engage to each other, the contact area between the chassis and the heat-dissipating member can be increased. As a result, the heat-dissipating effect can further be improved.

(7) The heat-dissipating member is integrally formed as one component. By making the heat-dissipating member as one component, heat transfer resistance within the heat-dissipating member can be reduced, and therefore, it is possible to improve the heat-dissipating effect of the heat-dissipating member.

(8) The chassis and the heat-dissipating member are made of the same material. By making the two components of the same material, heat transfer resistance between the heat-dissipating member and the chassis on the heat transfer path between the light source and the chassis can be minimized, thereby contributing to an improvement of the heat-dissipating efficiency.

(9) The heat-dissipating member is made of a metal. Because a metal has excellent heat transfer properties, an excellent heat-dissipating effect can be achieved.

(10) The metal includes aluminum. By making the heat-dissipating member of a metal that includes aluminum, it is possible to reduce the weight of the heat-dissipating member and the weight of the illumination device provided with the heat-dissipating member.

(11) The heat-dissipating member is formed by bending a metal plate. By making the heat-dissipating member in a manner similar to the light source substrate where the light source was mounted in the conventional configuration, it is possible to avoid a cost for new equipment, thereby preventing an increase in the manufacturing cost.

Next, in order to achieve the above-mentioned object, a display device of the present invention includes the above-mentioned illumination device and a display panel that performs display by using light from the illumination device. With this display device, in the illumination device that supplies light to the display panel, the heat-dissipating efficiency of heat generated by the light source can be improved, and a display device having an excellent heat-dissipating efficiency can also be provided.

Examples of the display panel include a liquid crystal panel. Such a display device can be applied as a liquid crystal display device to various applications such as televisions or displays of personal computers, for example, and is particularly suitable for large screens.

Effects of the Invention

According to the present invention, it is possible to improve the heat-dissipating efficiency of heat generated by the light source while saving space in an edge-light type illumination device.

DETAILED DESCRIPTION OF EMBODIMENTS

Embodiment 1

Embodiment 1 of the present invention will be described with reference to FIGS. 1 to 7.

Figure 1:
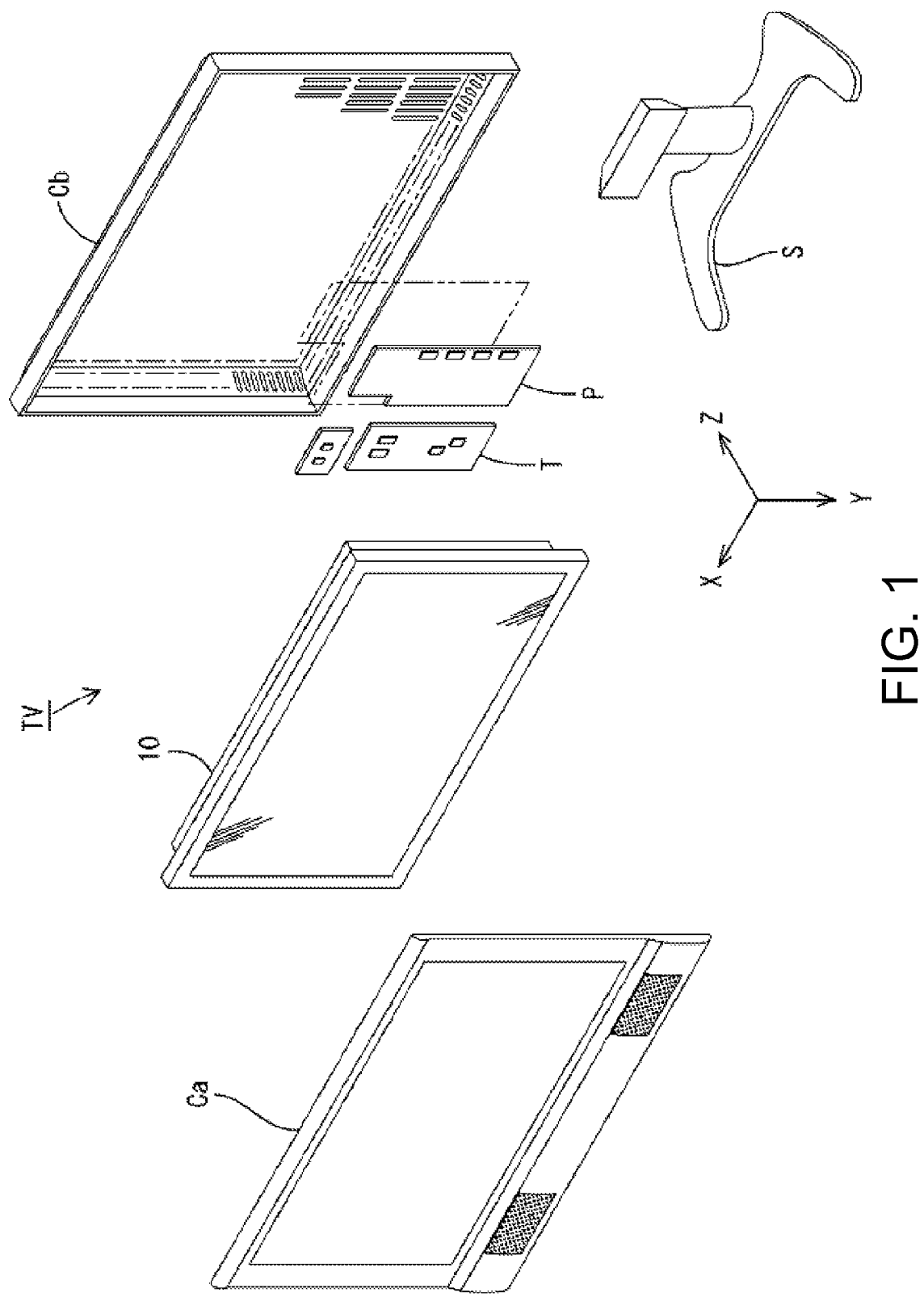
FIG. 1 is an exploded perspective view that shows a schematic configuration of a television receiver according to Embodiment 1 of the present invention.
Figure 2:
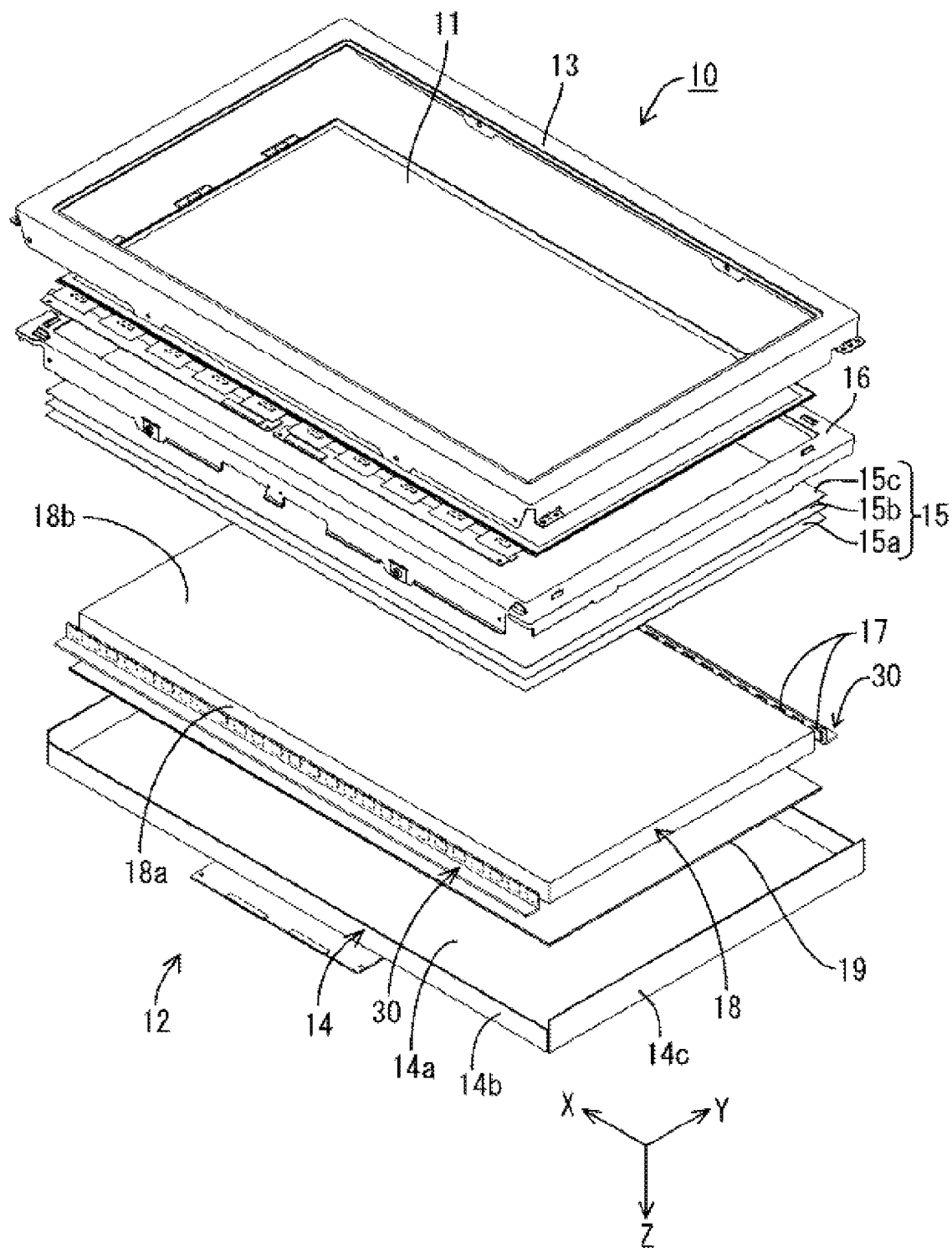
FIG. 2 is an exploded perspective view that shows a schematic configuration of a liquid crystal display device provided in the television receiver.
Figure 3:
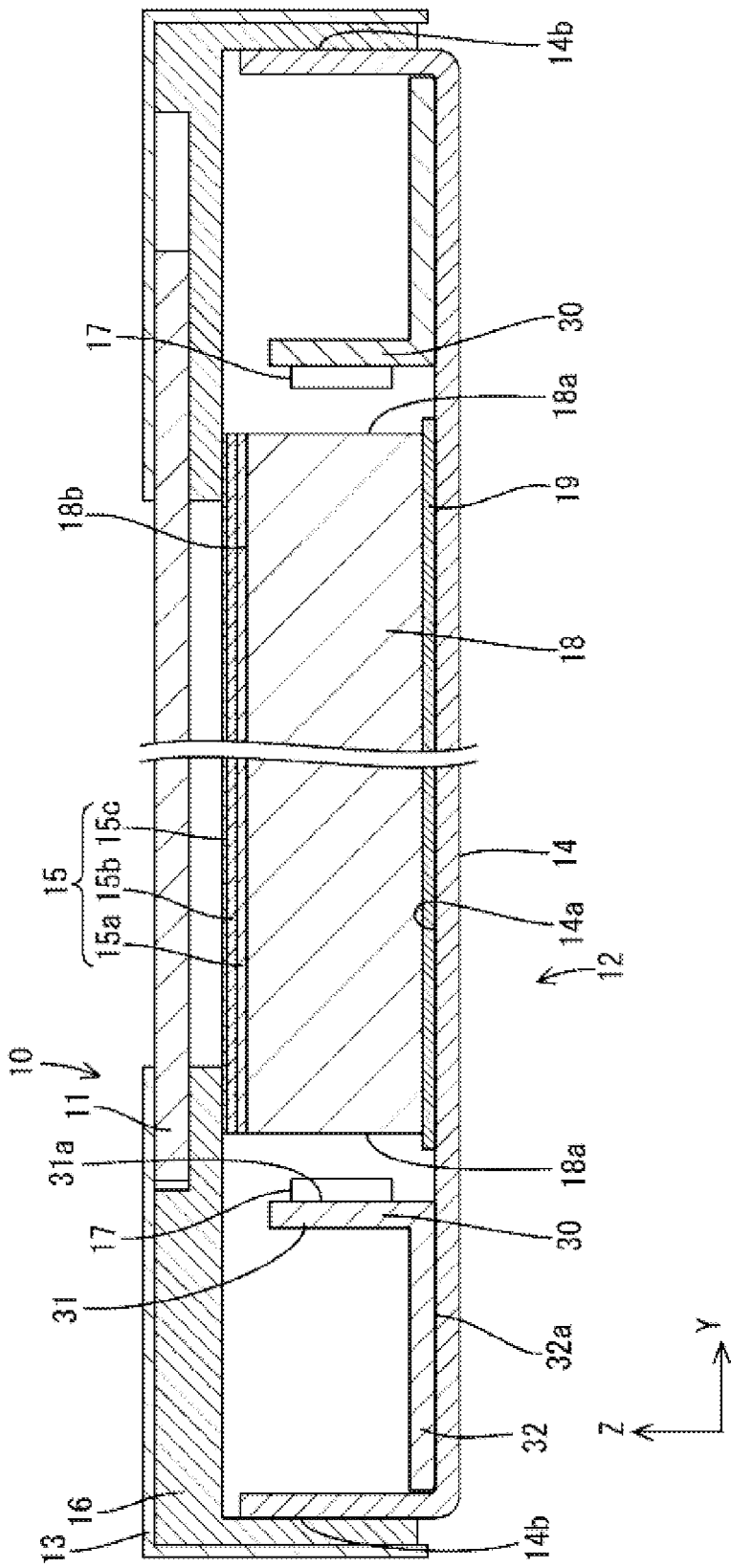
FIG. 3 is a cross-sectional view that shows a cross-sectional configuration of the liquid crystal display device along the shorter side direction.
Figure 4:
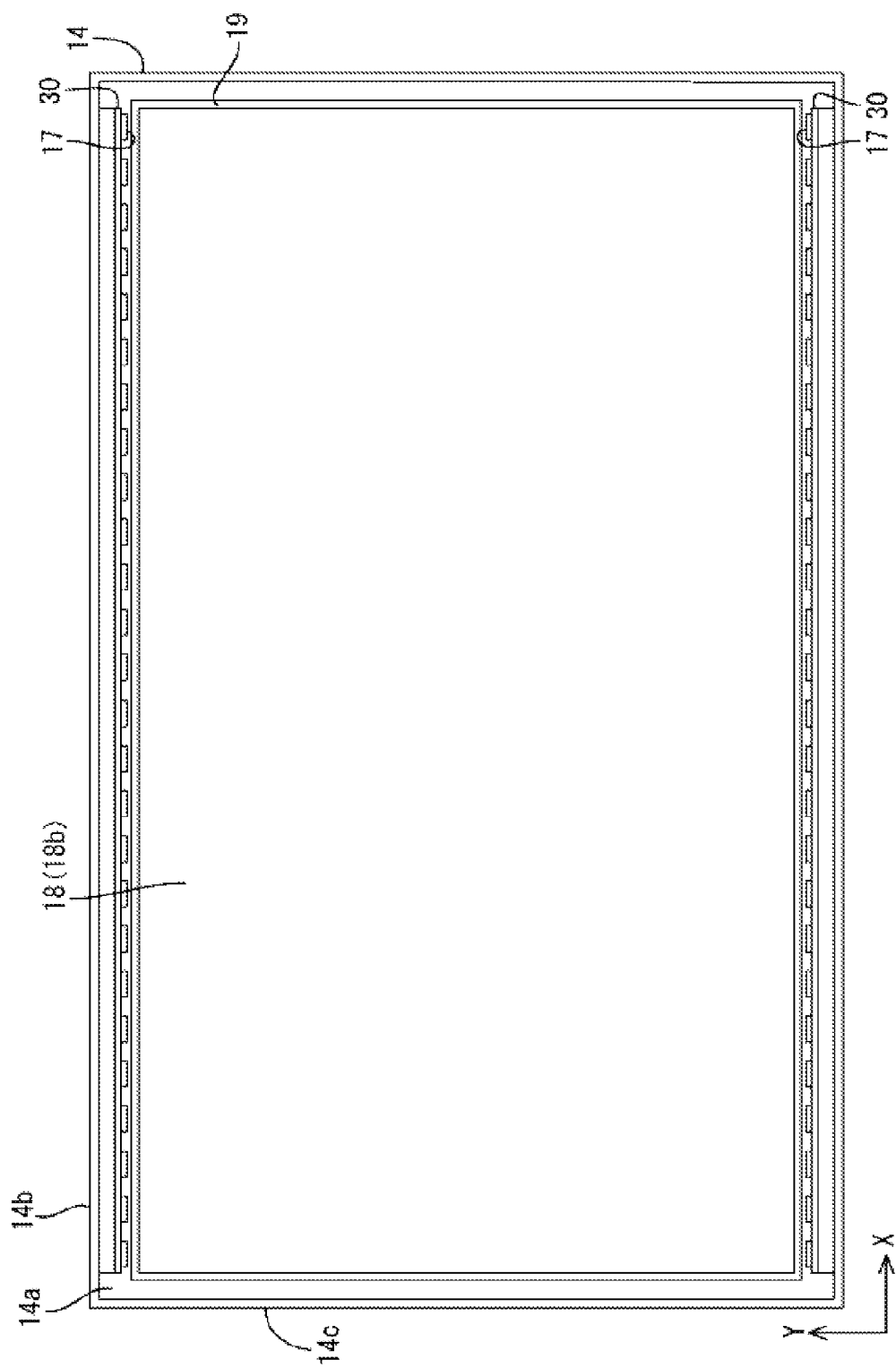
FIG. 4 is a plan view showing an arrangement of a backlight device viewed from the front side thereof.
Figure 5:
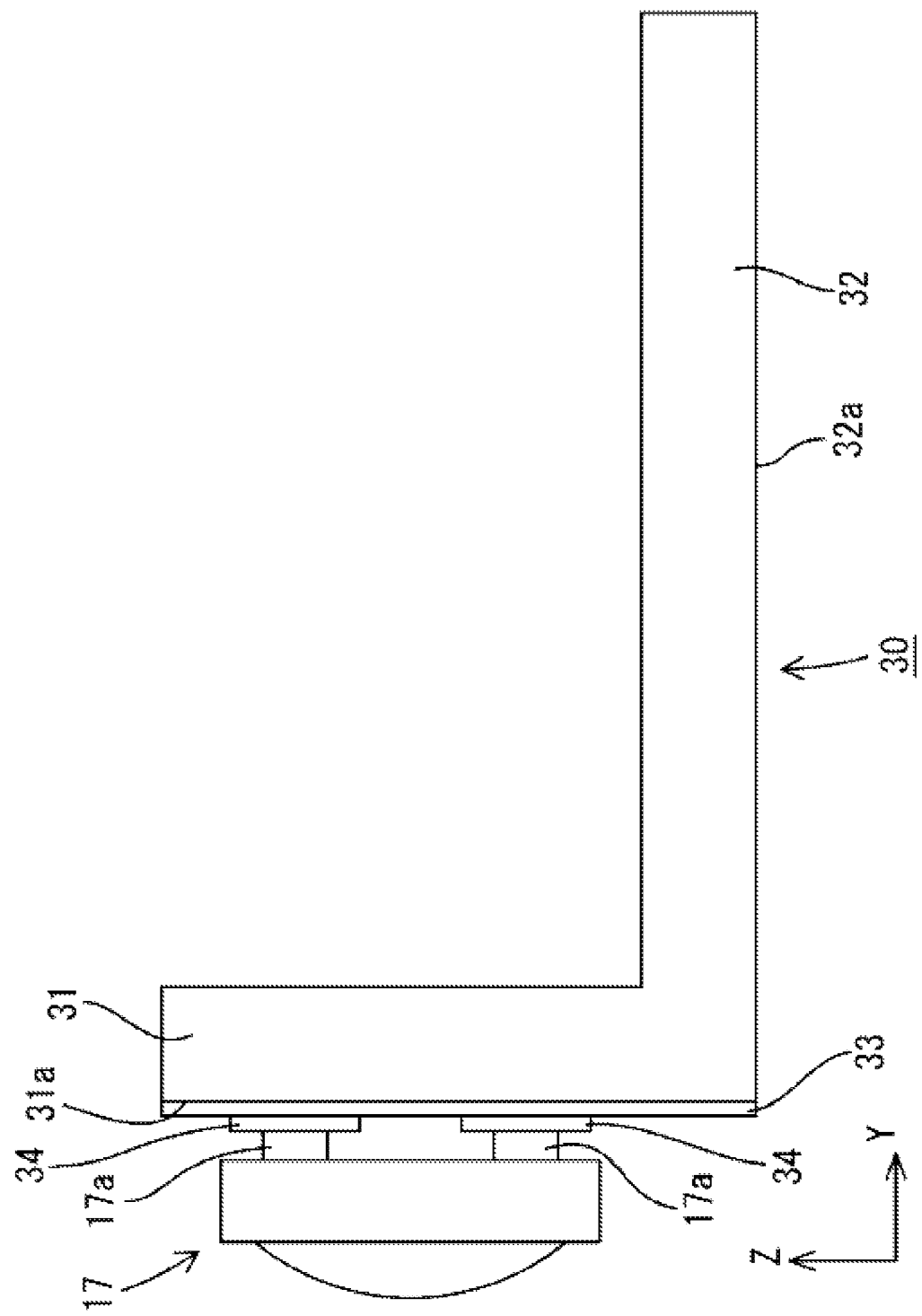
FIG. 5 is an enlarged cross-sectional view of a configuration of a main part of an LED mounting surface of a heat-dissipating member.
Figure 6:
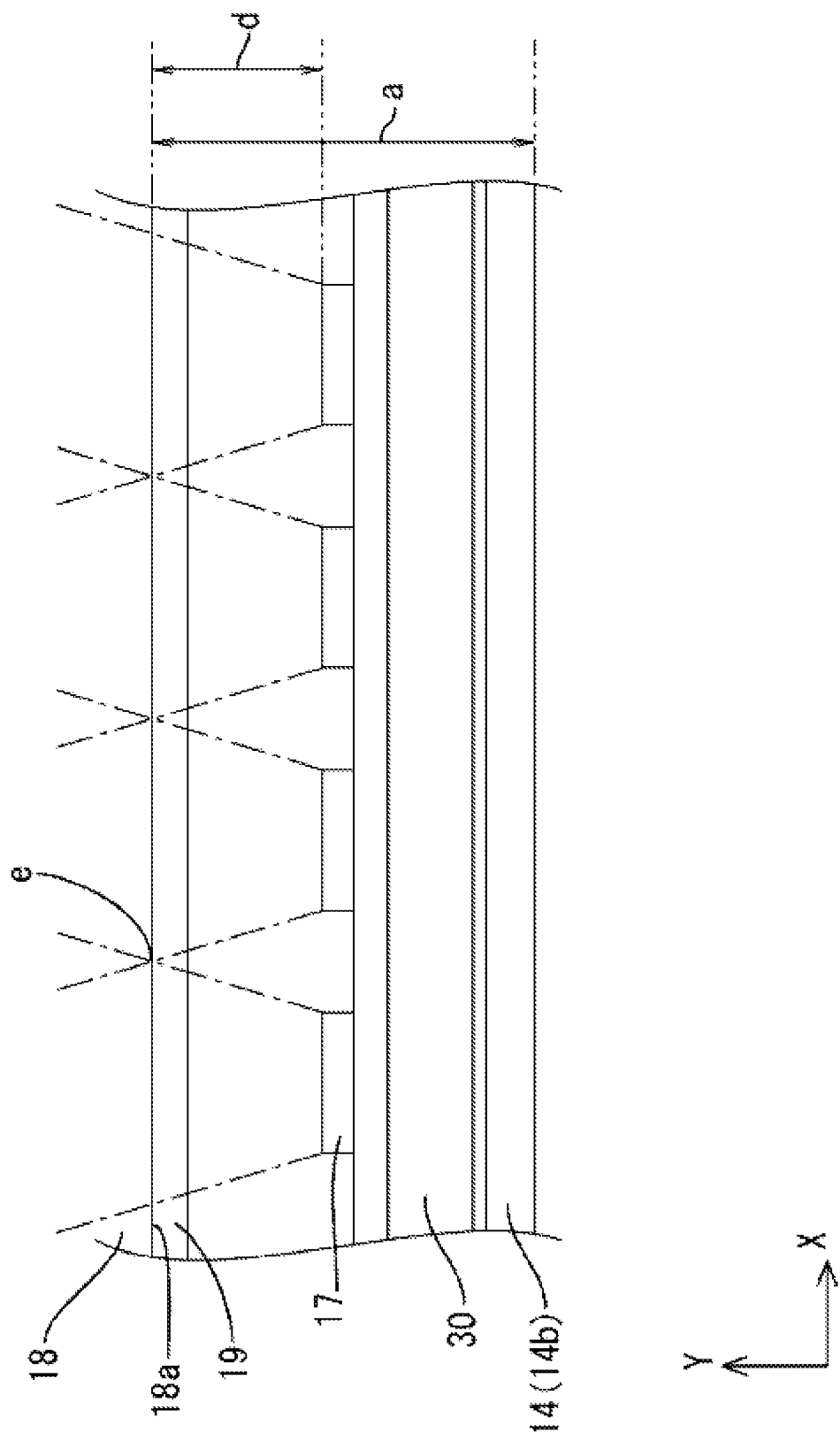
FIG. 6 is an enlarged plan view showing a positional relation between LEDs and a light guide plate.
Figure 7:
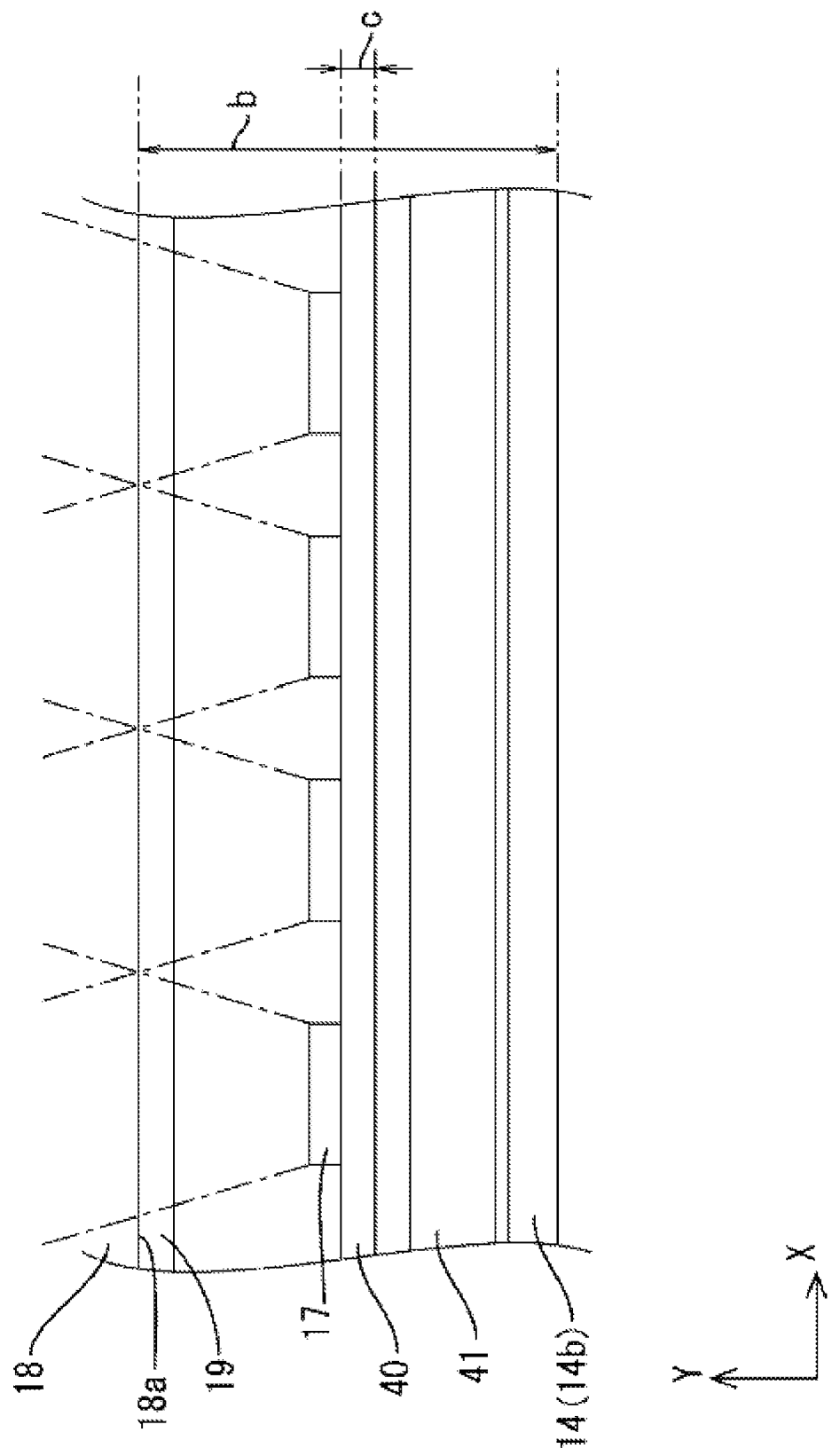
FIG. 7 is an enlarged plan view of an example of a conventional configuration in which an LED substrate is provided.

In the present embodiment, a liquid crystal display device 10 will be described as an example. FIG. 1 is an exploded perspective view of a schematic configuration of a television receiver of the present embodiment; FIG. 2 is an exploded perspective view of a schematic configuration of a liquid crystal display device; FIG. 3 is a cross-sectional view showing a cross-sectional configuration of the liquid crystal display device along the shorter side direction; FIG. 4 is a plan view showing an arrangement of a backlight device viewed from the front side thereof; FIG. 5 is an enlarged cross-sectional view showing a configuration of a main part of an LED mounting surface in a heat-dissipating member; FIG. 6 is an enlarged plan view showing a positional relation between the LEDs and a light guide plate of FIG. 4; and FIG. 7 is an enlarged plan view of an example of the conventional configuration in which an LED substrate is provided. Some of the drawings indicate an X axis, a Y axis, and a Z axis in a portion of the drawings, and each of the axes indicates the same direction for the respective drawings. The top side of FIG. 2 is the front side (front surface side, light-emitting side) and the bottom side is the rear side (rear surface side, a side opposite to the light-emitting side).

As shown in FIG. 1, a television receiver TV of the present embodiment includes a liquid crystal display device 10 (display device), front and rear cabinets Ca, Cb that sandwich the liquid crystal display device 10, a power source P, a tuner T, and a stand S. The liquid crystal display device 10 is formed in a quadrangle shape that is longer in the horizontal direction (rectangular shape) as a whole, and is disposed upright. As shown in FIG. 2, the liquid crystal display device 10 includes a liquid crystal panel 11 that is a display panel, and a backlight device 12 (illumination device) that is an external light source, and these are held together as one component by a frame shaped bezel 13 or the like.

As shown in FIG. 2, the liquid crystal panel 11 is formed in a rectangular shape in a plan view, and a pair of glass substrates is bonded to each other through a prescribed gap, having liquid crystal sealed therebetween. One of the glass substrates is provided with switching elements (TFTs, for example) connected to source wiring lines and gate wiring lines intersecting with each other, pixel electrodes connected to the switching elements, an alignment film, and the like. The other of the glass substrates is provided with a color filter made of colored portions of R (red), G (green), B (blue), and the like arranged in a prescribed pattern, an opposite electrode, an alignment film, and the like. Polarizing plates (not shown) are respectively provided on outer sides of the two substrates.

The liquid crystal panel 11 is controlled by a not-shown liquid crystal panel control part. The liquid crystal panel control part outputs a control signal to the liquid crystal panel 11 to control the drive of the liquid crystal panel 11 based on an output signal outputted from a not-shown image signal processing part. By supplying light from the backlight device 12 in synchronization with the control by the liquid crystal panel control part, a desired image can be displayed on a display screen of the liquid crystal panel 11. After receiving an image signal such as a television broadcasting signal inputted to the tuner T through an antenna, the image signal processing part conducts image processing on the inputted signal, and outputs the processed signal to the liquid crystal panel control part and the like.

As shown in FIG. 2, the backlight device 12 includes a chassis 14 having a substantially box shape that has an opening on the light-emitting surface side (side facing the liquid crystal panel 11), a group of optical members 15 disposed so as to cover the opening of the chassis 14 (a diffusion sheet 15a, a lens sheet 15b, and a reflective refraction sheet 15c), and a frame 16 disposed along the periphery of the chassis 14 and sandwiching the outer edges of the group of optical members 15 with the chassis 14, thereby holding the sheets. The chassis 14 stores therein LEDs 17 (light-emitting diode) that are light sources, heat-dissipating members 30 having the LEDs 17 mounted thereon and fixed to the chassis 14, a light guide plate 18 that guides light from the LEDs 17 to the group of optical members 15 (liquid crystal panel 11), and a reflective sheet 19 disposed on the rear side of the light guide plate 18. The backlight device 12 is a so-called edge-light type (side-light type) backlight in which the heat-dissipating members 30 having the LEDs 17 are provided at both edges along the respective longer sides, and the light guide plate 18 is disposed between the two heat-dissipating members 30. Each component of the backlight device 12 will be described in detail below.

As shown in FIGS. 2 and 3, the chassis 14 is made of a metal such as an aluminum material, and has a bottom plate 14a formed in a rectangular shape in a manner similar to the liquid crystal panel 11, a pair of longer side walls 14b that rise from the outer edges at the longer sides of the bottom plate 14a, and a pair of shorter side walls 14c that rise from the outer edges at the shorter sides of the bottom plate 14a, and as a whole, the chassis 14 is formed substantially in a shallow box shape that opens toward the front side. In the chassis 14, the longer side direction thereof matches the X axis direction (horizontal direction), and the shorter side direction thereof matches the Y axis direction (vertical direction). The bottom plate 14a is disposed so as to face and cover the rear side of the light guide plate 18, which will be described later, that is, an opposite surface thereof to the light-emitting surface 18b. Although not shown in the figure, on the rear side of the bottom plate 14a of the chassis 14, that is, on the rear surface of the backlight device 12, a power circuit board that supplies power to the liquid crystal panel 11 and the LEDs 17, an LED control circuit board that controls the drive of LEDs, a liquid crystal control circuit board that has the liquid crystal panel control part described above, and the like are provided.

As shown in FIG. 2, the optical members 15 are rectangular in a plan view in a manner similar to the liquid crystal panel 11 and the chassis 14. The optical members 15 include a diffusion sheet 15a, a lens sheet 15b, and a reflective polarizing sheet 15c stacked in this order from the side closer to the light guide plate 18, and are disposed between the liquid crystal panel 11 and the light guide plate 18. The optical members 15 have a function of converting light emitted from the LEDs 17 and transmitted through the light guide plate 18 to planar light. The frame 16 disposed over the optical members 15 is formed in a frame shape in a manner similar to the bezel 13. The frame 16 is fixed to the longer sides of the chassis 14, and receives the outer edges of the liquid crystal panel 11 from the rear side thereof.

The light guide plate 18 is made of a synthetic resin material (acrylic resin, for example) that has a sufficiently higher refractive index than air and that is substantially transparent (having high light transmittance). The light guide plate 18 is rectangular in a plan view, and is formed in a plate shape having a prescribed thickness. As shown in FIG. 2, the light guide plate 18 is disposed immediately below the liquid crystal panel 11 and the optical members 15 in the chassis 14, and is interposed between a pair of heat-dissipating members 30 that are provided at two edges of the chassis 14 along the longer sides. Specifically, the light guide plate 18 is disposed along the display surface of the liquid crystal panel 11 so as to be parallel thereto, and the main surface of the light guide plate 18 faces the front side (optical members 15 side).

In the light guide plate 18, two side faces along the longer sides that are disposed so as to face the LEDs 17 are light-receiving faces 18a through which light from the respective LEDs 17 enters. The main surface of the light guide plate 18 facing the front side (optical members 15 side) is a light-emitting surface 18b through which light from the LEDs 17 is emitted (see FIGS. 2 and 3). The light guide plate 18 has a function of receiving light emitted from the LEDs 17 along the Y axis direction through the light-receiving faces 18a, having the light travel therethrough while changing the direction of the light toward the optical members 15 (Z axis direction), and emitting the light through the light-emitting surface 18b.

The reflective sheet 19 is made of a synthetic resin (foam PET, for example), and the surface thereof is white so as to have excellent reflective properties. The reflective sheet 19 is disposed so as to cover the substantially entire rear surface of the light guide plate 18, that is, the opposite surface to the light-emitting surface 18b. In other words, the reflective sheet 19 is interposed between the bottom plate 14a of the chassis 14 and the light guide plate 18, and is disposed so as to cover almost the entire region of the bottom plate 14a except for regions where the heat-dissipating members 30 are provided. With this reflective sheet 19, it is possible to reflect light inside of the light guide plate 18 toward the light-emitting surface 18b.

As shown in FIGS. 2 to 5, each LED 17 has a configuration in which an LED chip is sealed by a resin material onto a substrate that is bonded to the heat-dissipating member 30. The LED chip mounted on the substrate has one type of primary light-emitting wavelength, and specifically, only emits blue light. On the other hand, the resin material that seals the LED chips has a fluorescent material dispersed therein, the fluorescent material emitting light of a prescribed color by being excited by the blue light emitted from the LED chip. Thus, the LED emits white light as a whole. As the fluorescent material, a yellow fluorescent material that emits yellow light, a green fluorescent material that emits green light, and a red fluorescent material that emits red light, for example, can be appropriately combined, or one of them can be used on its own. This way, the LED 17 can emit white light. The LED 17 is a top-emitting type in which a surface thereof opposite to the mounting surface facing the heat-dissipating member 30 is a light-emitting surface.

The heat-dissipating member 30 on which the LEDs 17 are mounted is made of the same metal material as the chassis 14 such as an aluminum material, and as shown in FIGS. 2 to 4, a pair of the heat-dissipating members 30 is disposed so as to correspond to the respective longer side walls 14b of the chassis 14, and is stored in the chassis 14 so as to have the light guide plate 18 therebetween along the shorter side direction. The heat-dissipating member 30 has a configuration in which a long flat plate extended in the longer side direction (X axis direction) of the chassis 14 (light guide plate 18) is bended to have an L-shaped cross section. More specifically, the heat-dissipating member 30 has a mounting section 31 where the LEDs 17 are mounted, and a heat-dissipating section 32 that is in contact with the bottom plate 14a of the chassis 14. The mounting section 31 faces the light-receiving face 18a of the light guide plate 18 in parallel therewith, and the heat-dissipating section 32 is extended along the bottom plate 14a of the chassis 14 in parallel therewith. That is, the mounting section 31 rises from an edge of the heat-dissipating section 32 toward the front side. The heat-dissipating section 32 is disposed closer to the longer side wall 14b than the mounting section 31, that is, on a side of the mounting section 31 opposite to the light guide plate 18.

The mounting section 31 has a mounting surface 31a that faces the light-receiving face 18a of the light guide plate 18, and the LEDs 17 are mounted on the mounting surface 31a. A plurality of LEDs 17 are arranged on the mounting surface 31a in a row along the longer side direction (X axis direction) at certain intervals. As shown in FIG. 5, the mounting surface 31a has an insulating layer 33 formed by applying an insulating material and circuit wiring 34 patterned on the insulating layer 33. The circuit wiring 34 is made of a metal film such as a copper film, and by connecting an electrode 17a of each LED 17 to the circuit wiring 34 by soldering, adjacent LEDs 17 are connected to each other in series. Between the mounting section 31 (LEDs 17) and the light-receiving face 18a of the light guide plate 18, a prescribed gap is provided. The gap is set to a smallest value that allows illumination areas of the respective LEDs 17 arranged in a row to cover the entire light-receiving face 18a.

On the other hand, the heat-dissipating section 32 has a heat-dissipating surface 32a facing the bottom plate 14a of the chassis 14, and is fixed to the bottom plate 14a by screws or the like such that an edge thereof faces the longer side wall 14b. The heat-dissipating surface 32a is disposed such that the entirety thereof makes contact with the bottom plate 14a with no gap therebetween, and heat generated by the LEDs 17 is transferred to the heat-dissipating section 32 through the mounting section 31, and after being transferred to the bottom plate 14a of the chassis 14 from the heat-dissipating surface 32a, is dissipated to the outside through the bottom plate 14a. Specifically, the heat-dissipating section 32 is extended from the mounting section 31 toward the longer side wall 14b, that is, in a direction opposite to the light guide plate 18, and the extension length is set such that an edge of the extended portion almost touches the longer side wall 14b. Therefore, the heat-dissipating section 32 is in contact with a region of the bottom plate 14a between the mounting section 31 and the longer side wall 14b entirely. The extension length of the heat-dissipating section 32 from the mounting section 31 is larger than the extension length of the mounting section 31 from the heat-dissipating section 32. That is, the heat-dissipating section 32 has a larger surface area than that of the mounting section 31. As a result, it is possible to ensure a sufficient contact area between the bottom plate 14a and the heat-dissipating section 32, thereby achieving an excellent heat-dissipating performance.

The configuration of the present embodiment has been described above. Below, effects of the present embodiment will be explained. The liquid crystal display device 10 having the above-mentioned configuration is made by assembling the liquid crystal panel 11 and the backlight device 12, which were prepared separately, by the bezel 13 and the like. In the assembly process, as shown in FIG. 3, the heat-dissipating members 30, which are constituting components of the backlight device 12, are placed in the chassis 14, and are fixed to the chassis 14 by screws or the like such that the edges of the extended portions of the heat-dissipating sections 32 are placed along the longer side walls 14b, and such that the heat-dissipating surfaces 32a overlap respective edge portions of the bottom plate 14a of the chassis 14 perpendicular to the shorter side direction. As shown in FIG. 6, the LEDs 17 are directly mounted on the heat-dissipating member 30 in advance. Therefore, unlike the conventional configuration of FIG. 7 in which an LED substrate 40 having LEDs 17 mounted thereon is fixed to a heat-dissipating member 41 by screws or the like, and the heat-dissipating member 41 is attached to the chassis 14, it is possible to eliminate the step of attaching the LED substrate 40 to the heat-dissipating member 41. Also, by omitting the LED substrate 40, it is possible to eliminate the LED substrate 40 itself and fixing parts such as screws for the LED substrate 40, thereby reducing the material cost.

When comparing FIG. 6 with FIG. 7, a distance "a" from the light-receiving face 18a of the light guide plate 18 to an outer surface of the longer side wall 14b of the chassis 14 (see FIG. 6) can be made shorter than the distance "b" (see FIG. 7) in the configuration using the LED substrate 40 by the thickness "c" of the LED substrate 40. Therefore, it is possible to reduce the width dimensions of the bezel 13 and the like. That is, it is possible to reduce the outer dimension, or the frame dimension, in particular, of the liquid crystal display device 10, thereby contributing to a narrower frame.

When the liquid crystal display device 10 manufactured in this manner is turned on, a not-shown liquid crystal panel control part controls the drive of the liquid crystal panel 11, and an LED control circuit board controls the drive of the respective LEDs 17 in the backlight device 12, thereby illuminating the liquid crystal panel 11 with illumination light, and as a result, a desired image is displayed on the liquid crystal panel 11. More specifically, when each LED 17 is turned on, light emitted from the LED 17 enters through the light-receiving face 18a of the light guide plate 18. The light that entered the light-receiving face 18a propagates through the light guide plate 18 while being reflected by the reflective sheet 19 and the like, and is emitted as substantially planar light through the light-emitting surface 18b.

A distance "d" between the LEDs 17 and the light-receiving face 18a of the light guide plate 18 shown in FIG. 6 is determined by the pitch of the LEDs 17 arranged in a row along the X axis direction and light-emitting properties of illumination light from the LEDs 17 such as illumination areas. The illumination areas of the respective LEDs 17 are indicated with one-dot chain lines in FIG. 6. When the illumination areas of the respective LEDs 17 do not cover the entire light-receiving face 18a (light-emitting surface 18b) of the light guide plate 18, that is, when an intersection "e" of illumination areas of adjacent LEDs 17 is located further into the light guide plate 18 beyond the light-receiving face 18a of the light guide plate 18 (position overlapping the light-emitting surface 18b), an area outside of the illumination area is formed on the light-emitting surface 18b, and such an area is likely to be recognized as a dark area. As a result, light emitted through the light-emitting surface 18b has uneven brightness. For this reason, it is necessary to ensure, between the light-emitting surfaces of the LEDs 17 and the light-receiving face 18a, a sufficient distance (gap) that allows illumination areas of the respective LEDs 17 to cover the entire light-receiving face 18a (light-emitting surface 18b). Specifically, by arranging the components such that the intersection "e" coincides with the light-receiving face 18a, the distance can be minimized. In the present embodiment, the LEDs 17 are directly mounted on the heat-dissipating member 30, thereby eliminating the LED substrate 40 provided in the conventional configuration, and therefore, a space corresponding to the thickness "c" of the LED substrate 40 can be included in the required minimum distance described above. As a result, while ensuring the required minimum distance "d" between the LEDs 17 and the light-receiving face 18a of the light guide plate 18, thereby preventing the uneven brightness, it is possible to reduce the frame area of the liquid crystal display device 10 and to reduce the size thereof.

Next, a heat-dissipating effect of the heat-dissipating member 30 will be explained. As shown in FIG. 3, heat generated by the respective LEDs 17 is transferred to the mounting section 31 first, then from the mounting section 31 to the heat-dissipating section 32, then from the heat-dissipating surface 32a of the heat-dissipating section 32 to the bottom plate 14a of the chassis 14, and is dissipated through the bottom plate 14a to the outside of the liquid crystal display device 10. In the present embodiment, the LEDs 17 are directly mounted on the heat-dissipating member 30, unlike the conventional configuration of FIG. 7 in which the LEDs are mounted on the LED substrate 40. Therefore, by the eliminated LED substrate 40, it is possible to reduce the number of boundary faces on the heat transfer path through which heat from the LEDs 17 is dissipated to the outside. As a result, the heat transfer resistance can be reduced, and the heat-dissipating efficiency can be improved. Also, by making the heat-dissipating member 30 of the same material (metal such as an aluminum material) as the chassis 14, the heat transfer resistance can further be reduced, thereby improving the heat-dissipating efficiency. With the configuration in which the entire heat-dissipating surface 32a of the heat-dissipating section 32 is in contact with the bottom plate 14a of the chassis 14 with no gap therebetween, the heat-dissipating efficiency is further improved.

As described above, the backlight device 12 of the present embodiment includes: the LEDs 17; the light guide plate 18 having the light-receiving face 18a and the light-emitting surface 18b, the light-receiving face 18a receiving light from the LEDs 17, the light-emitting surface 18b emitting the light; the chassis 14 having the bottom plate 14a disposed in parallel with the light-emitting surface 18b, the chassis 14 having the LEDs 17 disposed on edges of the bottom plate 14a; and the heat-dissipating member 30 having the mounting section 31 and the heat-dissipating section 32, the mounting section 31 facing the light-receiving face 18a and having the LEDs 17 mounted thereon, the heat-dissipating section 32 being connected to the mounting section 31 to allow heat transfer and being in contact with the bottom plate 14a of the chassis 14.

With this configuration, the LED substrate 40 does not have to be provided, unlike the conventional configuration of FIG. 7 in which the LEDs 17 are mounted on the LED substrate 40 that is provided separately from the heat-dissipating member 41, and the LED substrate 40 is attached to the heat-dissipating member 41. Therefore, it is possible to improve the heat-dissipating efficiency of heat generated by the LEDs 17 while saving space. That is, on the heat transfer path between the LEDs 17 and the chassis 14 through which heat from the LEDs 17 is dissipated to the outside, the number of boundary faces can be reduced as a result of omitting the LED substrate 40. This makes it possible to reduce the heat transfer resistance, thereby improving the heat-dissipating efficiency. Also, the space can be reduced by the thickness "c" of the eliminated LED substrate 40, achieving a reduction in outer dimension of the backlight device 12, and in particular, the frame area around the light guide plate 18.

In a limited space around the light guide plate 18, the distance between the LEDs 17 and the chassis 14 can be made longer by the thickness "c" of the eliminated LED substrate 40, and the increased area can be used as a region to mix the LED light. Therefore, it is possible to mitigate the problem caused by uneven pitch between the respective LEDs 17 with respect to the light guide plate 18.

Among the constituting members of the backlight device 12, the LED substrate 40 itself and fixing parts therefor such as screws can be eliminated, thereby contributing to a reduction in manufacturing cost. Also, because the step of attaching the LED substrate 40 to the heat-dissipating member 41 can be eliminated, a reduction in manufacturing cost due to a reduction in man-hour can be expected.

In the configuration of the heat-dissipating member 30, the heat-dissipating section 32 in contact with the bottom plate 14a of the chassis 14 is provided in addition to the mounting section 31 where the LEDs 17 are mounted. With this configuration, heat from the LEDs 17 transferred to the mounting section 31 is transferred to the chassis 14 through the heat-dissipating section 32, and is dissipated to the outside through the chassis 14. By providing the heat-dissipating section 32, it is possible to increase the contact area between the heat-dissipating member 30 and the chassis 14 as compared to the configuration in which heat is directly transferred to the chassis 14 from the mounting section 31, and as a result, the heat-dissipating efficiency of the heat-dissipating member 30 can be improved.

The heat-dissipating section 32 is provided on the side of the mounting section 31 opposite to the light guide plate 18. With this configuration, the heat-dissipating section 32 is provided closer to the outer edge of the chassis 14, which is on the side of the mounting section 31 opposite to the light guide plate 18, and therefore, it is possible to improve the heat-dissipating efficiency. In other words, if the heat-dissipating section 32 is disposed closer to the light guide plate 18 than the mounting section 31, and overlaps a region between the LEDs 17 and the light-receiving surface 18a of the light guide plate 18 where light from the light sources is mixed, the heat-dissipating section 32 would absorb heat from the region having a higher temperature than other region due to light from the light source, in addition to the heat transferred to the mounting section 31. As a result, the heat-dissipating efficiency by the heat-dissipating section 32 would be reduced. On the other hand, when the heat-dissipating section 32 is provided closer than the mounting section 31 to the outer edge of the chassis 14, which has a lower temperature than an area closer to the light guide plate 18, the heat-dissipating efficiency can be improved.

In a manner similar to above, if the heat-dissipating section 32 is disposed closer to the light guide plate 18 than the mounting section 31, a portion of the light guide plate 18 and a portion of the heat-dissipating section 32 overlap each other, possibly causing the thickness of the backlight device 12 to be increased. That is, the distance "d" between the LEDs 17 and the light-receiving face 18a of the light guide plate 18 is determined by the properties of the LEDs 17 and the pitch therebetween, and therefore, in consideration of the thickness reduction of the backlight device 12, the dimension of the heat-dissipating section 32 in the same direction as the distance "d" between the LEDs 17 and the light-receiving face 18a of the light guide plate 18 cannot exceed the distance "d." On the other hand, if the heat-dissipating section 32 is disposed on the side of the mounting section 31 opposite to the light guide plate 18, the contact area between the heat-dissipating section 32 and the chassis 14, for example, can be ensured regardless of the distance "d" between the LEDs 17 and the light-receiving face 18a of the light guide plate 18. This makes it possible to further improve the heat-dissipating efficiency while achieving a thickness reduction of the backlight device 12.

By using the LEDs 17 as the light source, the life of the light source can be extended and the power consumption can be reduced.

The heat-dissipating member 30 is integrally formed as one component. By making the heat-dissipating member 30 as one component, the heat transfer resistance within the heat-dissipating member 30 can be reduced, and therefore, it is possible to improve the heat-dissipating effect of the heat-dissipating member 30.

The chassis 14 and the heat-dissipating member 30 are made of the same material. By making the two components of the same material, the heat transfer resistance between the heat-dissipating member 30 and the chassis 14 on the heat transfer path between the LEDs 17 and the chassis 14 can be minimized, thereby contributing to an improvement of the heat-dissipating efficiency.

The heat-dissipating member 30 is made of a metal such as an aluminum material. Because a metal has excellent heat transfer properties, an excellent heat-dissipating effect can be achieved. Also, by making the heat-dissipating member 30 of a material that includes aluminum, it is possible to reduce the weight of the heat-dissipating member 30 and the weight of the backlight device 12 provided with the heat-dissipating member 30.

Embodiment 1 of the present invention has been described above, but the present invention is not limited to the embodiment above, and may include a modification example below, for example. In the modification example below, components similar to those in the embodiment above are given the same reference characters, and the descriptions thereof may be omitted.

Modification Example 1 of Embodiment 1

Figure 8:
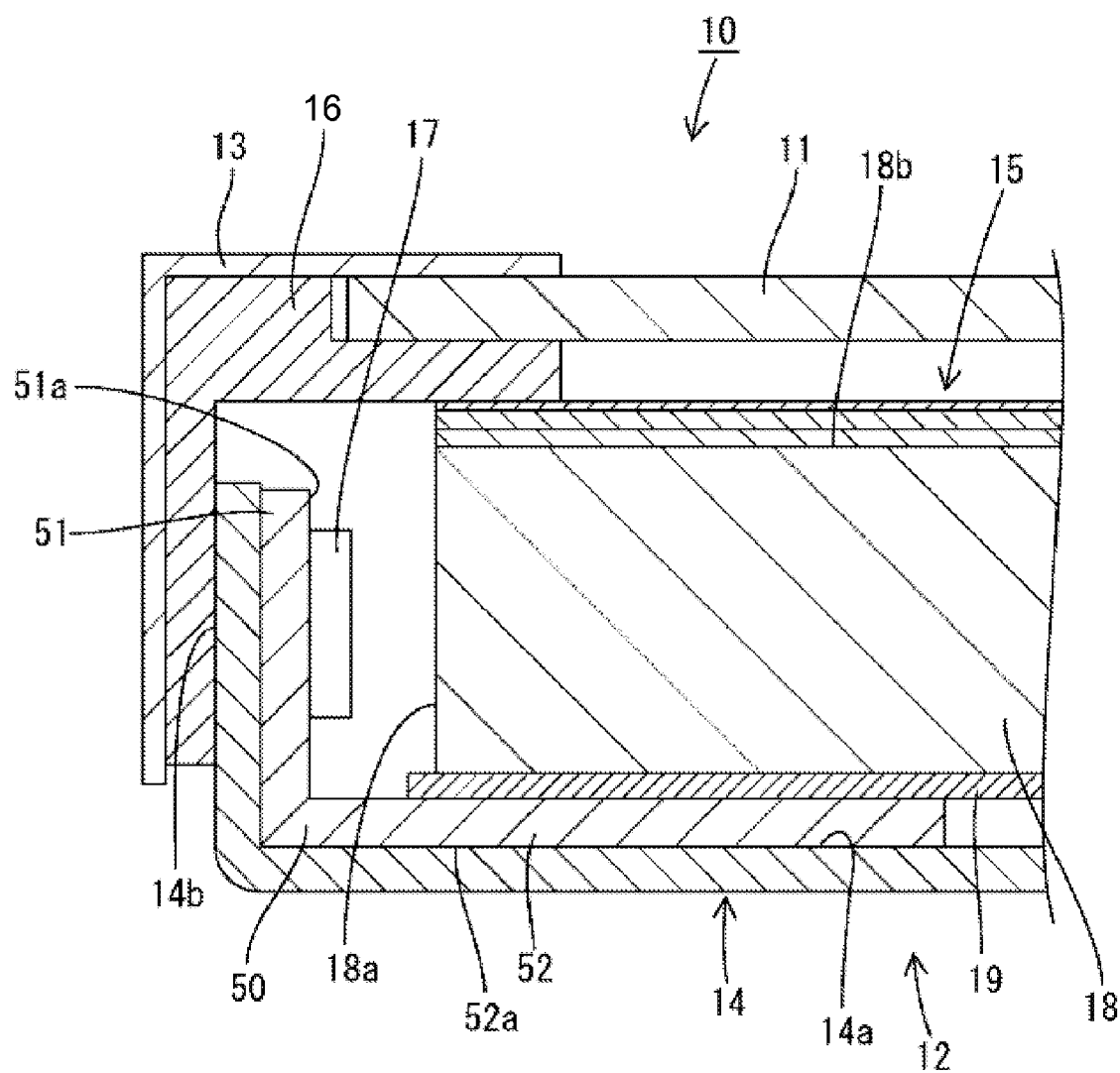
FIG. 8 is an enlarged cross-sectional view showing a cross-sectional configuration of a main part of the liquid crystal display device of Modification Example 1 of Embodiment 1 along the shorter side direction.

Modification Example 1 of Embodiment 1 will be described with reference to FIG. 8. The present modification example differs from Embodiment 1 in the extension direction of the heat-dissipating section 32 of the heat-dissipating member 30. FIG. 8 is an enlarged cross-sectional view showing a cross-sectional configuration of a main part of the liquid crystal display device 10 of the present modification example along the shorter side direction.

In a heat-dissipating member 50, a portion thereof facing the light-receiving face 18a of the light guide plate 18 is a mounting section 51, and a portion thereof extended from the mounting section 51 along the bottom plate 14a of the chassis 14 toward the light guide plate 18 (in a direction opposite to the longer side wall 14b) is a heat-dissipating section 52 that is perpendicular to the mounting section 51. The mounting section 51 is disposed such that a side surface thereof opposite to a mounting surface 51a where the LEDs 17 are mounted is in contact with the inner surface of the longer side wall 14b of the chassis 14. The heat-dissipating section 52 has an extension length such that the edge of the extended portion from the mounting section 51 toward the light guide plate 18 goes beyond the light-receiving face 18a of the light guide plate 18. In other words, the heat-dissipating section 52 is disposed so as to partially overlap the light guide plate 18. The heat-dissipating section 52 has a heat-dissipating surface 52a that faces the bottom plate 14a of the chassis 14, and the heat-dissipating member 50 is fixed to the bottom plate 14a such that the heat-dissipating surface 52a is in contact with the bottom plate 14a with no gap therebetween.

With this configuration, the heat-dissipating section 52 is disposed closer to the light guide plate 18 than the mounting section 51, and therefore, the distance between the mounting section 51 and the longer side wall 14b can be made smaller than the above-mentioned configuration of Embodiment 1 in which the heat-dissipating section 32 is disposed closer to the longer side wall 14b than the mounting section 31. As a result, it is possible to save space by reducing the distance between the light-receiving face 18a of the light guide plate 18 and the outer side surface of the longer side wall 14b of the chassis 14, resulting in an advantage in reducing the outer dimension of the backlight device 12, or in particular, the frame area around the light guide plate 18. Also, because the mounting section 51 is in contact with the longer side wall 14b of the chassis 14, and the heat-dissipating section 52 is in contact with the bottom plate 14a of the chassis 14, heat can be transferred directly to the chassis 14 from not only the heat-dissipating section 52, but also the mounting section 51. As a result, the heat-dissipating efficiency can be improved.

Embodiment 2

Figure 9:
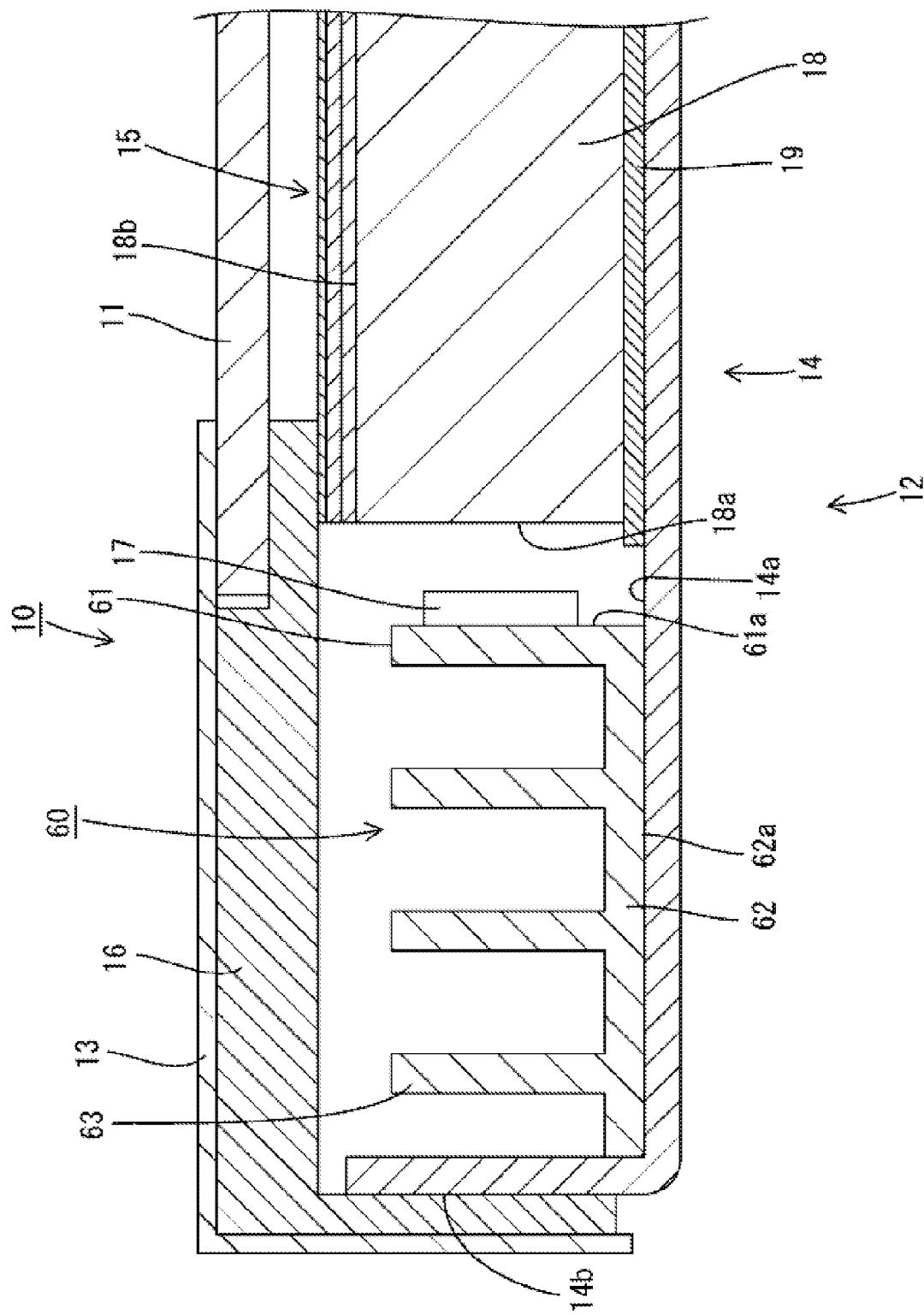
FIG. 9 is an enlarged cross-sectional view showing a cross-sectional configuration of a main part of a liquid crystal display device of Embodiment 2 along the shorter side direction.

Embodiment 2 of the present invention will be described with reference to FIG. 9.

The present embodiment differs from Embodiment 1 in that a heat-dissipating member 60 is provided with a fin structure. Because other configurations are similar to those in Embodiment 1, the descriptions thereof are omitted. FIG. 9 is an enlarged cross-sectional view that shows a cross-sectional configuration of a main part of the liquid crystal display device 10 of the present embodiment along the shorter side direction.

In the heat-dissipating member 60, a portion thereof facing the light-receiving face 18a of the light guide plate 18 is a mounting section 61, and the a portion thereof extended from the mounting section 61 along the bottom plate 14a of the chassis 14 toward the longer side wall 14b is a heat-dissipating section 62 that is perpendicular to the mounting section 61. The heat-dissipating section 62 has a heat-dissipating surface 62a that faces the bottom plate 14a of the chassis 14, and the surface area of the heat-dissipating surface 62a is larger than the surface area of a mounting surface 61a where the LEDs 17 are mounted. In the heat-dissipating section 62, from a side surface thereof opposite to the heat-dissipating surface 62a, a plurality of fins 63 are formed so as to protrude upwardly. The plurality of fins 63 are disposed at substantially even intervals so as to be parallel to the mounting section 61, and are formed in a flat plate shape in a manner similar to the mounting section 61. The fins 63 have the substantially same height and same length as those of the mounting section 61. The heat-dissipating member 60 can be attached to the chassis 14 by screws or the like such that the heat-dissipating surface 62a makes contact with the bottom plate 14a of the chassis 14 with no gap therebetween, for example.

By providing the plurality of fins 63 to the heat-dissipating member 60, the surface area of the heat-dissipating member 60 can be made larger, and therefore, it is possible to dissipate heat transferred to the heat-dissipating member 60 more efficiently. Because the fins 63 in the heat-dissipating section 62 are provided so as to be parallel to the mounting section 61 that rises from the heat-dissipating section 62 perpendicularly thereto, the fins 63 can also be formed by protrusion forming, for example, thereby achieving an excellent formability. The fins 63 protrude from the heat-dissipating section 62, and the protrusion length is the same as the height of the mounting section 61. This makes it possible to achieve an excellent heat-dissipating efficiency without making the heat-dissipating member 60 larger than necessary. The surface area of the heat-dissipating surface 62a is larger than the surface area of the mounting surface 61a. This makes it possible to further increase the heat transfer efficiency to the chassis 14, thereby improving the heat-dissipating efficiency.

Embodiment 2 of the present invention has been described above, but the present invention is not limited to the embodiment above, and may include modification examples below, for example. In the modification examples below, components similar to those in the embodiment above are given the same reference characters, and the descriptions thereof may be omitted.

Modification Example 1 of Embodiment 2

Figure 10:
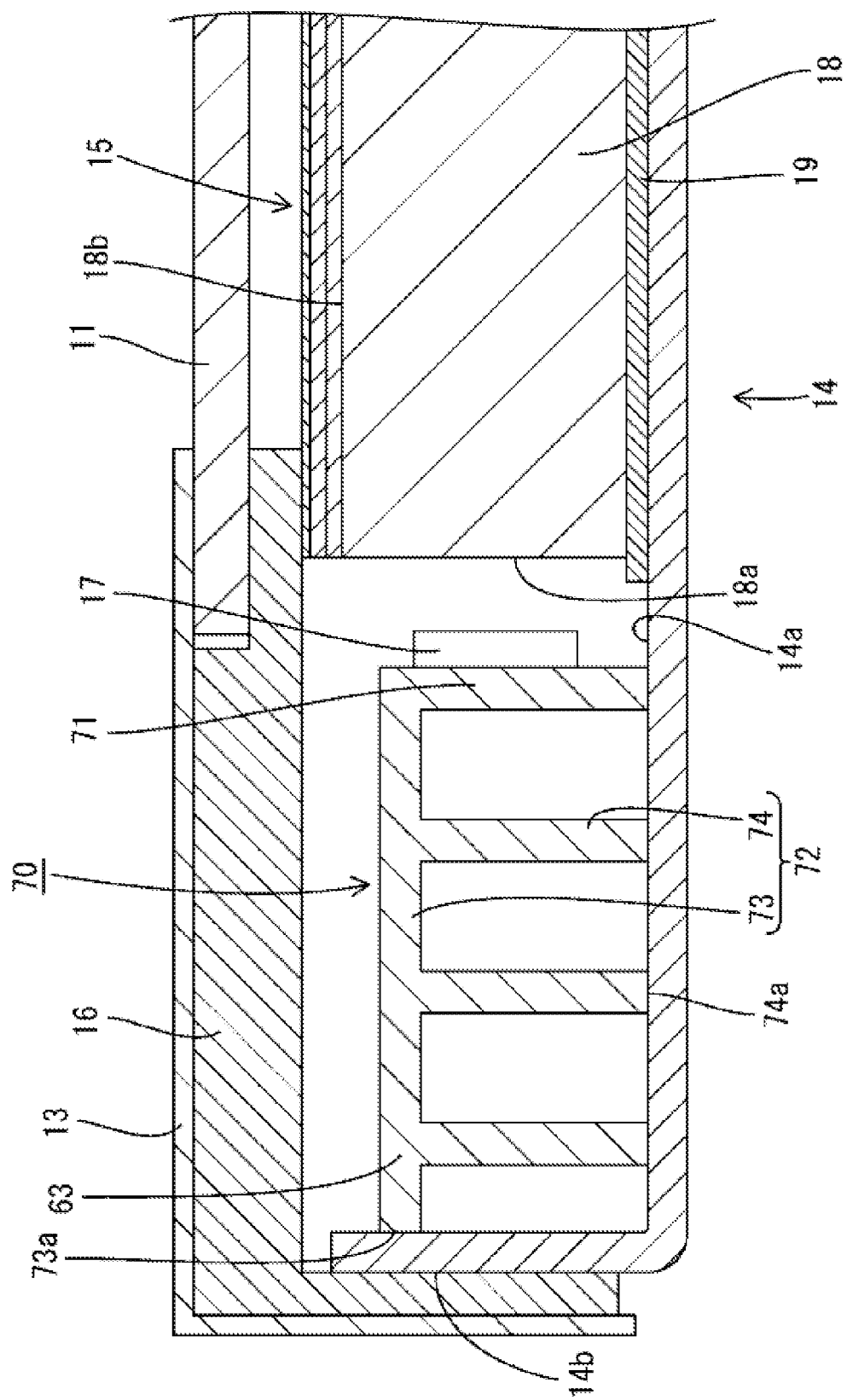
FIG. 10 is an enlarged cross-sectional view showing a cross-sectional configuration of a main part of a liquid crystal display device of Modification Example 1 of Embodiment 2 along the shorter side direction.

Modification Example 1 of Embodiment 2 will be described with reference to FIG. 10. The present modification example differs from Embodiment 2 in the protrusion direction of fins 74 of a heat-dissipating member 70 with respect to the chassis 14. FIG. 10 is an enlarged cross-sectional view showing a cross-sectional configuration of a main part of the liquid crystal display device 10 of the present modification example along the shorter side direction.

The heat-dissipating member 70 includes a mounting section 71 that faces the light-receiving face 18a of the light guide plate 18, and a heat-dissipating section 72 extended from the mounting section 71 toward the longer side wall 14b of the chassis 14. The heat-dissipating section 72 includes a base 73 that is extended toward the longer side wall 14b from an end of the mounting section 71 opposite to the bottom plate 14, and a plurality of fins 74 that protrude from the base 73 toward the bottom plate 14a of the chassis 14. The plurality of fins 74 are disposed at substantially even intervals so as to be parallel to the mounting section 71, and are formed in a flat plate shape in a manner similar to the mounting section 71. The fins 74 have the substantially same height and same length as those of the mounting section 71. The protrusion end face 73a of the base 73 is in contact with the longer side wall 14b, and the protrusion end faces 74a of the respective fins 74 are in contact with the bottom plate 14a. Therefore, the protrusion end face 73a of the base 73 and the protrusion end faces 74a of the fins 74 are all heat-dissipating faces. Heat generated by the LEDs 17 is transferred to the base 73 and the fins 74 of the heat-dissipating section 72 from the mounting section 71, and is dissipated to the bottom plate 14a of the chassis 14 through the respective heat-dissipating faces 73a and 74a. The heat-dissipating member 70 can be attached to the chassis 14 by fixing the heat-dissipating faces 74a of the fins 74 to the bottom plate 14a of the chassis 14 through an adhesive member such as a double-sided tape, for example.

With this configuration, in a manner similar to Embodiment 2, by providing the plurality of fins 74, the surface area of the heat-dissipating member 70 can be made larger, and therefore, it is possible to dissipate heat transferred to the heat-dissipating member 70 more efficiently.

Modification Example 2 of Embodiment 2

Figure 11:
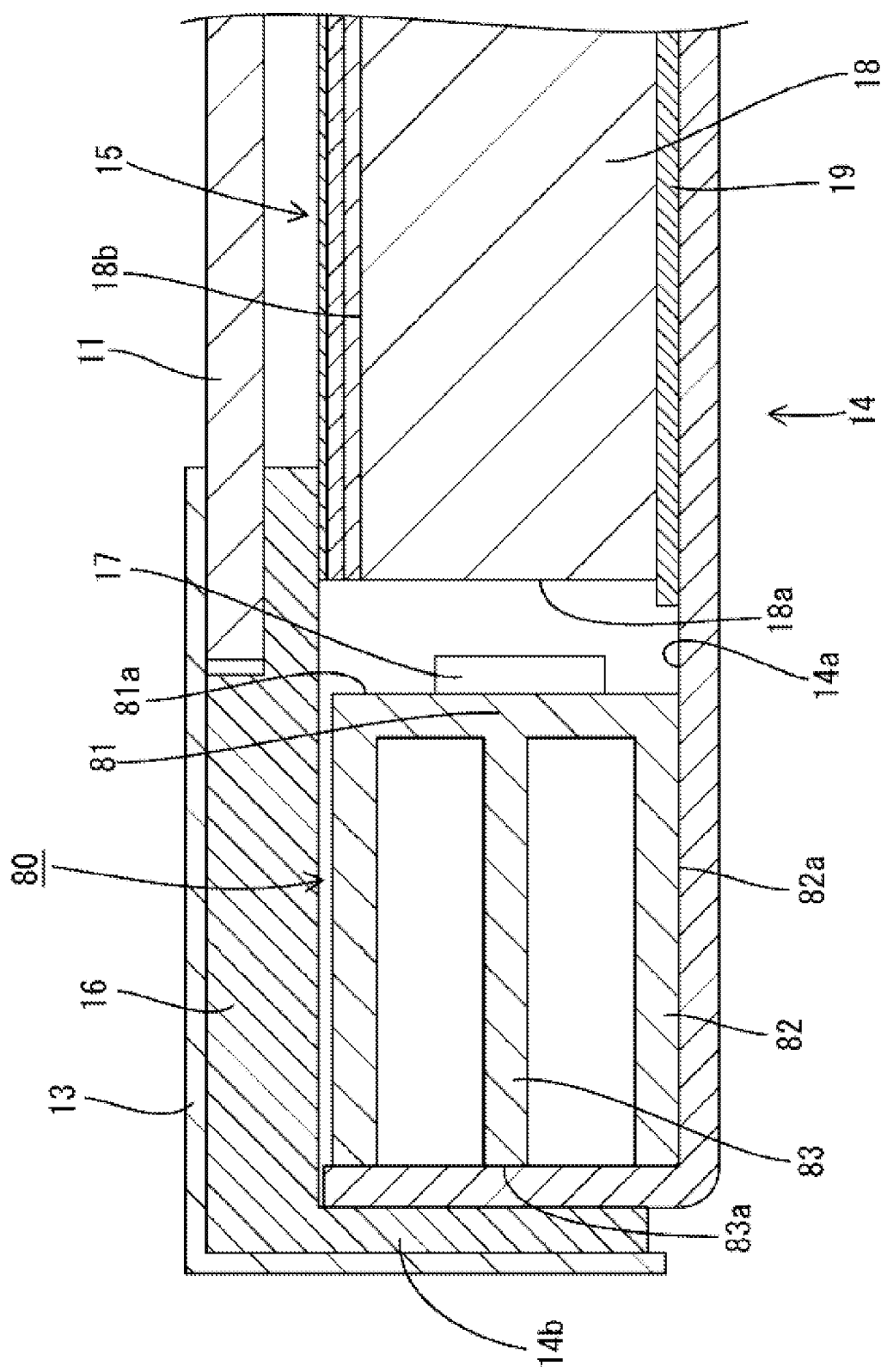
FIG. 11 is an enlarged cross-sectional view showing a cross-sectional configuration of a main part of a liquid crystal display device of Modification Example 2 of Embodiment 2 along the shorter side direction.

Modification Example 2 of Embodiment 2 will be described with reference to FIG. 11. The present modification example differs from Embodiment 2 and Modification Example 1 of Embodiment 2 in having fins 83 that protrude from the mounting section 81 of the heat-dissipating member 80. FIG. 11 is an enlarged cross-sectional view that shows a cross-sectional configuration of a main part of the liquid crystal display device 10 of the present modification example along the shorter side direction.

In the heat-dissipating member 80, a portion thereof facing the light-receiving face 18a of the light guide plate 18 is a mounting section 81, and a portion thereof extended from the mounting section 81 along the bottom plate 14a of the chassis 14 toward the longer side wall 14b is a heat-dissipating section 82. The mounting section 81 faces the light-receiving face 18a of the light guide plate 18, and has a mounting surface 81a where the LEDs 17 are mounted. The heat-dissipating section 82 has a heat-dissipating surface 82a that faces the bottom plate 14a of the chassis 14. From a side surface of the mounting section 81 that is opposite to the mounting surface 81a, a plurality of fins 83 protrude toward the longer side wall 14b of the chassis 14. The protrusion end face of each fin 83 is in contact with the longer side wall 14b of the chassis 14, and the contact surface is a second heat-dissipating surface 83a. The plurality of fins 83 are disposed at substantially even intervals, and are in parallel with the heat-dissipating section 82. The fins 83 are formed in a flat plate shape in a manner similar to the heat-dissipating section 82. The fins 83 have the substantially same extension length from the mounting section 81 and length along the Y axis direction as those of the heat-dissipating section 82. This heat-dissipating member 80 can be installed by screws or the like such that the heat-dissipating surface 82a thereof is in contact with the bottom plate 14a of the chassis 14 with no gap therebetween, for example.

With this configuration, in a manner similar to Embodiment 2 and Modification Example 1 of Embodiment 2, by providing the fins 83, the surface area of the heat-dissipating member 80 can be made larger, and therefore, it is possible to dissipate heat transferred to the heat-dissipating member 80 more efficiently. Because the fins 83 are formed to protrude from the side surface of the mounting section 81 that is opposite to the mounting surface 81a where the LEDs 17 are mounted, it is possible to transfer heat generated by the LEDs 17 more directly to the fins 83, and to dissipate heat to the chassis 14 or to a space inside of the chassis 14 as compared to the configuration in which the fins 83 are provided to the heat-dissipating section 82. Also, because the second heat-dissipating surfaces 83a, which are protrusion end faces of the fins 83, are in contact with the longer side wall 14b of the chassis 14, heat can be transferred to the chassis 14 through not only the heat-dissipating surface 82a, but also the second heat-dissipating surfaces 83a. As a result, it is possible to further improve the heat-dissipating efficiency.

By forming the fins 83 so as to protrude from the mounting section 81, the strength of the mounting section 81 where the LEDs 17 are mounted can be improved, which makes the mounting section 81 less susceptible to thermal deformation caused by heat generated by the LEDs 17. As a result, it becomes possible to maintain a constant distance between the LEDs 17 and the light-receiving face 18a of the light guide plate 18, which prevents variations in distance between the LEDs 17 and the light-receiving face 18a of the light guide plate 18, and therefore, the uneven brightness can be prevented.

Embodiment 3

Figure 12:
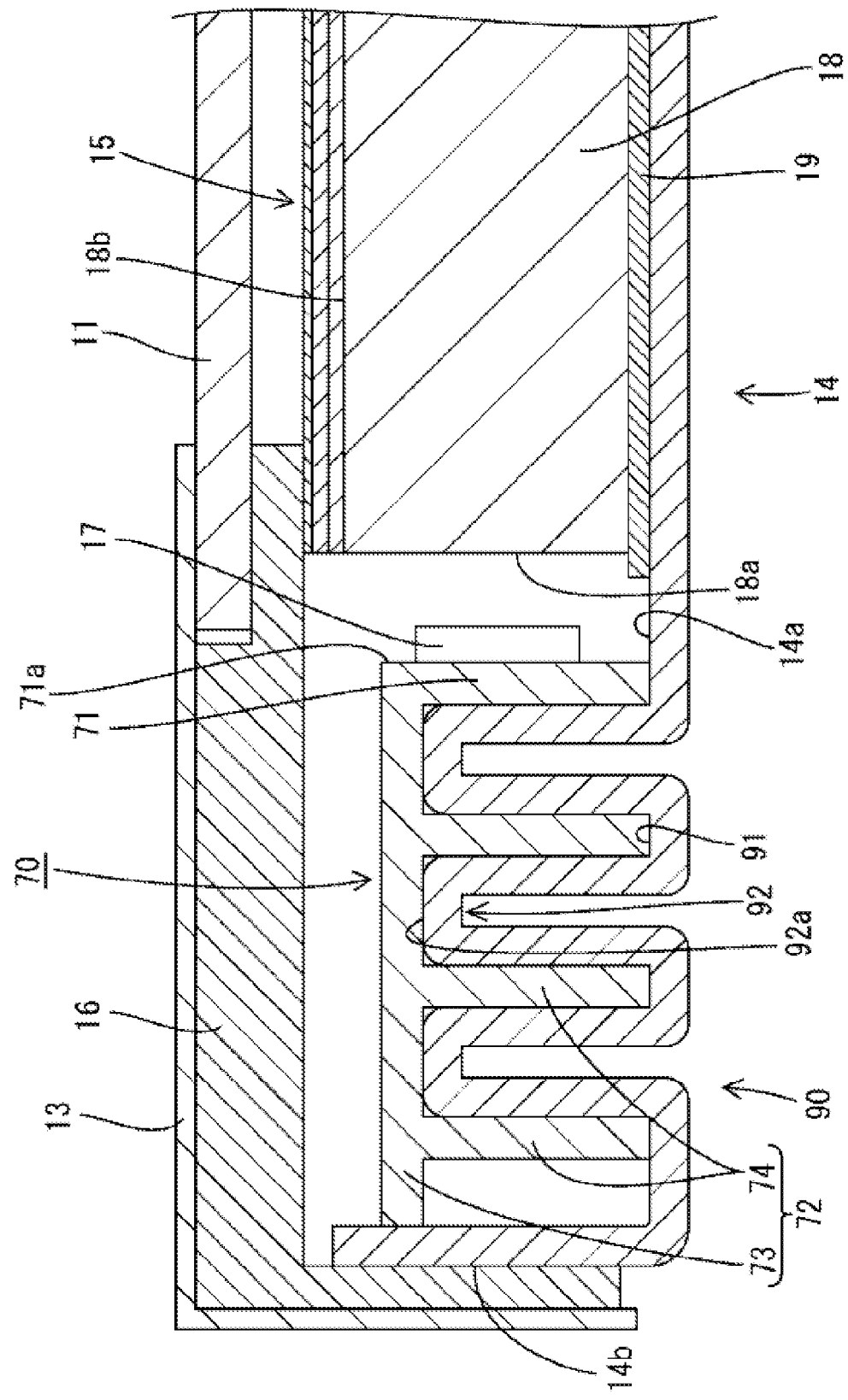
FIG. 12 is an enlarged cross-sectional view showing a cross-sectional configuration of a main part of a liquid crystal display device of Embodiment 3 along the shorter side direction.

Embodiment 3 of the present invention will be described with reference to FIG. 12.

The present embodiment has a configuration in which the heat-dissipating member 70 described in Modification Example 1 of Embodiment 2 is employed, and the heat-dissipating member 70 is formed to engage the chassis 14.

Because other configurations are similar to those in Embodiment 2 and Modification Example 1 of Embodiment 2, the descriptions thereof are omitted. FIG. 12 is an enlarged cross-sectional view that shows a cross-sectional configuration of a main part of the liquid crystal display device 10 of the present embodiment along the shorter side direction.

The bottom plate 14a of the chassis 14 has an engaging section 90 that is interposed between the mounting section 71 and an adjacent fin 74 and between respective adjacent fins 74, thereby making contact with the base 73 of the heat-dissipating section 72 and respective surfaces of the fins 74 with no gap therebetween. The engaging section 90 is formed by bending a portion of the bottom plate 14a between the mounting section 71 and the longer side wall 14b a plurality of times, so as to have protrusions and recesses in a cross-sectional view. In the engaging section 90, recesses 91 that are recessed from the front side have the fins 74 therein, respectively, and each recess 91 is in contact with the outer surfaces of a fin 74 with no gap therebetween. The top 92a of each protrusion 92 that protrudes toward the front side is in contact with a surface of the base 73 on the side facing the bottom plate 14a. Among the protrusions 92, a protrusion 92 closest to the mounting section 71 is in contact with a surface of the mounting section 71 that is opposite to the mounting surface 71a. The heat-dissipating member 70 can be attached to the chassis 14 by inserting the fins 73 into the engaging section 90, and it is not necessary to use screws or the like.

With this configuration, in a manner similar to Embodiment 2 and Modification Example 1 of Embodiment 2, by having the fins 74, the surface area of the heat-dissipating member 70 can be made larger, and in addition, because the engaging section 90 that is in contact with the outer surfaces of the fins 74 with no gap therebetween is provided to the chassis 14, the contact area between the chassis 14 and the heat-dissipating member 70 can be increased, thereby further improving the heat-dissipating effect. The heat-dissipating member 70 is fixed to the chassis 14 by inserting fins 74 into the engaging section 90 of the chassis 14, and therefore, it is not necessary to use screws or the like to fix the heat-dissipating member 70. As a result, the number of component can be reduced, and the manufacturing cost can therefore be reduced.

Embodiment 3 of the present invention has been described above, but the present invention is not limited to the embodiment above, and may include a modification example below, for example. In the modification example below, components similar to those in the embodiment above are given the same reference characters, and the descriptions thereof may be omitted.

Modification Example 1 of Embodiment 3

Figure 13:
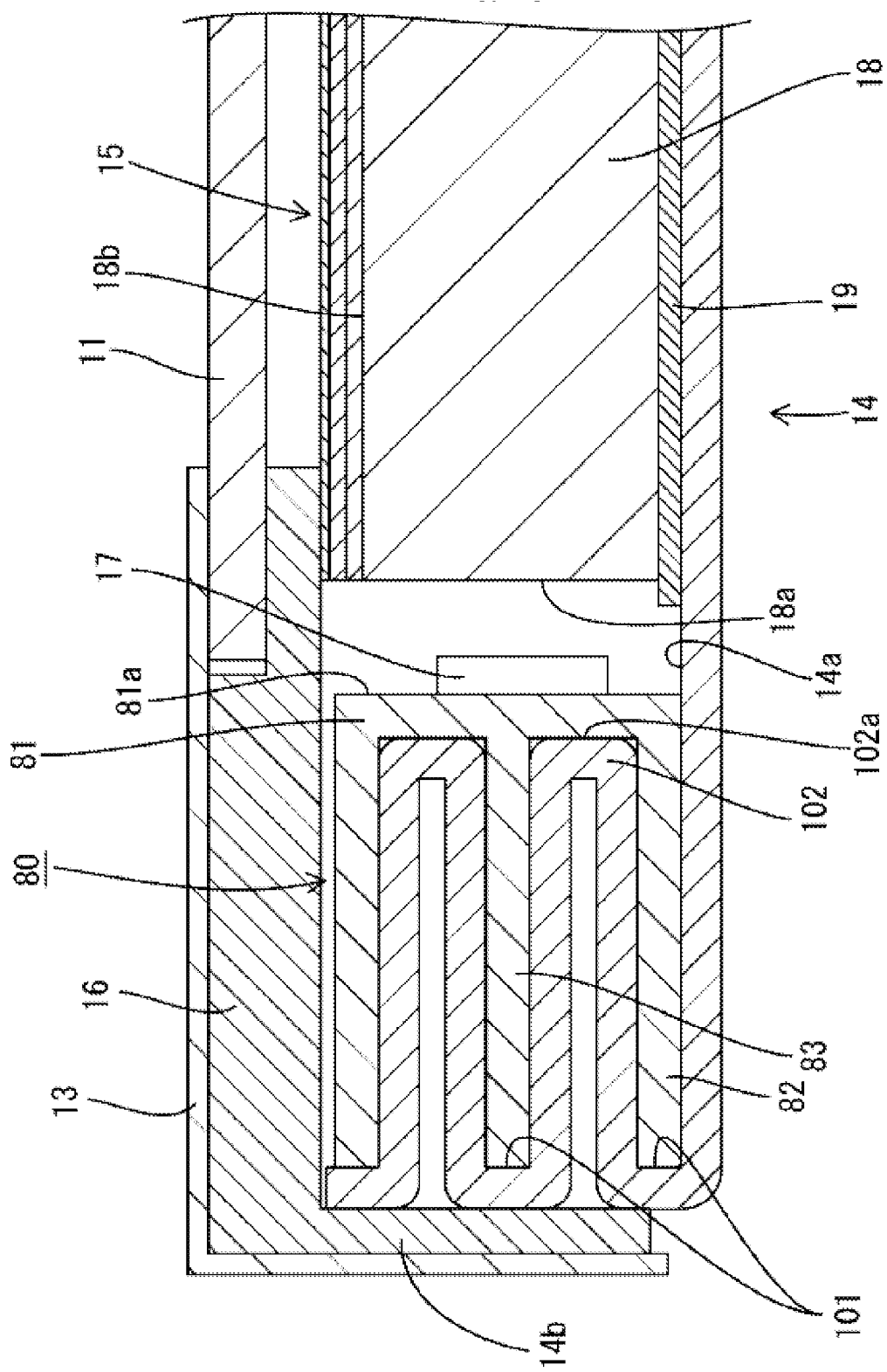
FIG. 13 is an enlarged cross-sectional view showing a cross-sectional configuration of a main part of a liquid crystal display device of Modification Example 1 of Embodiment 3 along the shorter side direction.

Modification Example 1 of Embodiment 3 will be described with reference to FIG. 13. The present modification example has the same configuration as Embodiment 3 in that the heat-dissipating member 80 engages an engaging section 100 of the chassis 14, but differs therefrom in that the heat-dissipating member 80 described in Modification Example 2 of Embodiment 2 is used as the heat-dissipating member. Because other configurations are similar to those in Embodiment 3, the descriptions thereof are omitted. FIG. 13 is an enlarged cross-sectional view that shows a cross-sectional configuration of a main part of the liquid crystal display device 10 of the present modification example along the shorter side direction.

The longer side wall 14b of the chassis 14 has an engaging section 100 that is interposed between the heat-dissipating section 82 and an adjacent fin 83 and between respective adjacent fins 83, and is in contact with the mounting section 81, the heat-dissipating section 82, and respective surfaces of the fins 83 with no gap therebetween. The engaging section 100 is formed by bending the longer side wall 14b a plurality of times, so as to have protrusions and recesses in a cross-sectional view. In the engaging section 100, recesses 101 facing the light guide plate 18 have the heat-dissipating section 82 and fins 83 inserted therein, respectively, and the outer surfaces of the heat-dissipating section 82 and the fins 83 are in contact with side surfaces of the recesses 101 with no gap therebetween. The top 102a of each protrusion 102 that protrudes toward the light guide plate 18 is in contact with a side surface of the mounting section 81 that is opposite to the mounting surface 81a. The heat-dissipating member 80 can be attached to the chassis 14 by inserting the fins 83 into the engaging section 100, and therefore, it is not necessary to fix the heat-dissipating member 80 using screws or the like.

With this configuration, in a manner similar to Embodiment 2 and Modification Example 2 of Embodiment 2, by proving the fins 83, the surface area of the heat-dissipating member 80 can be made larger, and the heat-dissipating efficiency of the heat-dissipating member 80 can be improved. Also, in a manner similar to Modification Example 2 of Embodiment 2, heat generated by the LEDs 17 can be directly transferred from the mounting section 81 to the fins 83, and the heat can be dissipated to the chassis 14 through the fins 83. As a result, an excellent heat-dissipating effect can be achieved. In a manner similar to Embodiment 3, by having a configuration in which the outer surfaces of the fins 83 are in contact with the engaging section 100 of the chassis 14 with no gap therebetween, the contact area between the chassis 14 and the heat-dissipating member 80 can be increased, and the heat-dissipating efficiency from the heat-dissipating member 80 to the chassis 14 can be improved. As a result, the overall heat-dissipating efficiency in dissipating heat generated by the LEDs 17 to the outside of the chassis 14 can be improved. The heat-dissipating member 80 is fixed to the chassis 14 by inserting the fins 83 into the engaging section 100 of the chassis 14, and therefore, it is not necessary to use screws or the like to fix the heat-dissipating member 80. As a result, the number of component can be reduced, and the manufacturing cost can therefore be reduced.

Other Embodiments

The present invention is not limited to the embodiments shown in the drawings and described above, and the following embodiments are also included in the technical scope of the present invention, for example.

(1) The respective embodiments above described the configuration in which the heat-dissipating members 30 having the LEDs 17 mounted thereon are disposed at both edges on the longer sides of the backlight device 12, but the present invention is not limited to such. The present invention includes a configuration in which a heat-dissipating member 30 is disposed at one edge on a longer side of the backlight device 12 or a configuration in which the heat-dissipating members 30 are disposed at both edges on the shorter sides of the backlight device 12, or the heat-dissipating member 30 is disposed at one edge on the shorter sides of the backlight device 12.

(2) The respective embodiments above employed an edge-light-type backlight device 12 that uses LEDs 17 as a light source, but the present invention is not limited to such. An edge-light type backlight device that uses a linear light source such as a discharge tube may also be employed, for example.

(3) In Embodiment 2 above, an example in which the fins provided to the heat-dissipating member were formed in a flat plate shape was described, but the present invention is not limited to such. The fins may alternatively be formed in a rod shape, for example.

(4) In Embodiment 2 above, an example in which the fins were integrally formed with the heat-dissipating member, for example, but the present invention is not limited to such. It is also possible to employ a configuration in which fins are prepared separately from a heat-dissipating member that has a mounting section and a heat-dissipating section, and are attached to the heat-dissipating member, for example.

(5) In Embodiment 3 above, the engaging section was formed by bending the chassis 14 by a bending process or the like, but the present invention is not limited to such. For example, it is also possible to employ a configuration in which an engaging section is prepared separately from the chassis 14, and is attached to the chassis 14.

(6) In addition to those described in the respective embodiments above, other shapes, arrangements, and materials of the heat-dissipating member may appropriately be employed.

(7) In the respective embodiments above, the LED 17 provided with an LED chip that emits blue light only was described, but alternatively, an LED provided with an LED chip that emits purple light only can be used. Other than the LEDs described above, it is possible to use an LED that includes three LED chips that respectively emit R, G, and B.

(8) In the respective embodiments above, the mounting section and the heat-dissipating section of the heat-dissipating member were configured such that the surface area of the heat-dissipating section is larger than the surface area of the mounting section, for example, but the surface area of the heat-dissipating section may be substantially the same as the surface area of the mounting section, or the surface area of the mounting section may be made larger than the surface area of the heat-dissipating section.

(9) In the respective embodiments above, TFTs were used as the switching elements in the liquid crystal display device 10, but the present invention can be applied to a liquid crystal display device that uses a switching element other than a TFT (a thin film diode (TFD), for example), and the present invention can also be applied to a black and white liquid crystal display device besides a color liquid crystal display device.

(10) In the respective embodiments above, the liquid crystal display device 10 using the liquid crystal panel 11 as a display panel was described, but the present invention can be applied to a display device that uses another type of display panel.

(11) In the respective embodiments above, the television receiver 10 having a tuner T was described, but the present invention can also be applied to a display device that does not have a tuner.

DESCRIPTION OF REFERENCE CHARACTERS

10 liquid crystal display device (display device)
11 liquid crystal panel (display panel)
12 backlight device (illumination device)
14 chassis
14a bottom plate
14b longer side wall
14c shorter side wall
15 optical member
17 LED (light source)
18 light guide plate
18a light-receiving face
18b light-emitting surface
19 reflective sheet
30 heat-dissipating member
31 mounting section
31a mounting surface
32 heat-dissipating section
32a heat-dissipating surface
TV television receiver

The invention claimed is:

1. An illumination device, comprising:
a light source;
a light guide plate that has a light-receiving surface and a light-emitting surface, the light-receiving surface facing the light source and receiving light from the light source, the light-emitting surface emitting said light;
a chassis that has a bottom plate disposed in parallel with the light-emitting surface, the chassis having the light source disposed in an edge portion of the bottom plate; and
a heat-dissipating member that has a mounting section and a heat-dissipating section, the mounting section facing the light-receiving surface and having the light source mounted thereon, the heat-dissipating section being connected to the mounting section to allow heat transfer and being in contact with the bottom plate of the chassis,
wherein the heat-dissipating member includes a fin that protrudes from the mounting section or from the heat-dissipating section,
wherein a plurality of said fins are provided,
wherein the respective fins protrude toward the chassis, and
wherein the chassis has an engaging section having recesses and protrusions, the engaging section fitting in the plurality of fins so as to engage the heat-dissipating member.

2. The illumination device according to claim 1, wherein the heat-dissipating section is disposed on a side of the mounting section opposite to the light guide plate.

3. The illumination device according to claim 1, wherein the mounting section has a mounting surface on which the light source is mounted,
wherein the heat-dissipating section has a heat-dissipating surface that is in contact with the chassis, and
wherein the heat-dissipating surface is extended in a direction that is perpendicular to the mounting surface, and a surface area of the heat-dissipating surface is larger than a surface area of the mounting surface.

4. The illumination device according to claim 1, wherein the light source is an LED.

5. The illumination device according to claim 1, wherein the mounting section is formed in a flat plate shape, and one surface thereof is a mounting surface on which the light source is mounted,
wherein the heat-dissipating section is formed in a flat plate shape, and one surface thereof is a heat-dissipating surface that is in contact with the chassis, and
wherein the heat-dissipating section is disposed perpendicularly to the mounting section, and the fin protrudes in a direction perpendicular to the mounting surface or the heat-dissipating surface.

6. The illumination device according to claim 1, wherein the heat-dissipating member is integrally formed as one component.

7. The illumination device according to claim 1, wherein the chassis and the heat-dissipating member are made of a same material.

8. The illumination device according to claim 1, wherein the heat-dissipating member is made of a metal.

9. The illumination device according to claim 8, wherein the metal includes aluminum.

10. The illumination device according to claim 8, wherein the heat-dissipating member is formed by bending a metal plate.

11. A display device, comprising:
   the illumination device according to claim 1; and
   a display panel that displays an image using light from the illumination device.

12. The display device according to claim 11, wherein the display panel is a liquid crystal panel made of a pair of substrates and liquid crystal sealed therebetween.

13. A television receiver, comprising the display device according to claim 11.

* * * * *